(12) United States Patent
Cerros Martinez et al.

(10) Patent No.: US 11,856,174 B2
(45) Date of Patent: Dec. 26, 2023

(54) SYSTEM AND METHOD FOR DOSING INK IN DIGITAL MULTICHANNEL PRINTERS

(71) Applicant: CMA IMAGING EUROPE SA, Grand Duchy of Luxembourg (LU)

(72) Inventors: Gerardo Andres Cerros Martinez, Grand Duchy of Luxembourg (LU); Ronald Terrazas Mallea, Grand Duchy of Luxembourg (LU)

(73) Assignee: CMA IMAGING EUROPE SA, Grand Duchy of Luxembourg (LU)

( * ) Notice: Subject to any disclaimer, the term of this patent is extended or adjusted under 35 U.S.C. 154(b) by 238 days.

(21) Appl. No.: 16/895,016

(22) Filed: Jun. 8, 2020

(65) Prior Publication Data

US 2020/0384786 A1 Dec. 10, 2020

(30) Foreign Application Priority Data

Jun. 6, 2019 (LU) ........................................ 101260

(51) Int. Cl.
*H04N 1/58* (2006.01)
*H04N 1/60* (2006.01)
*H04N 1/00* (2006.01)

(52) U.S. Cl.
CPC ........... *H04N 1/58* (2013.01); *H04N 1/00411* (2013.01); *H04N 1/6005* (2013.01); *H04N 1/605* (2013.01); *H04N 1/6058* (2013.01)

(58) Field of Classification Search
CPC .. B41J 29/393; G06F 3/04847; H04N 1/6058; H04N 1/603
See application file for complete search history.

(56) References Cited

U.S. PATENT DOCUMENTS

| | | | | |
|---|---|---|---|---|
| 6,654,150 | B1 * | 11/2003 | Rozzi | H04N 1/603 358/1.9 |
| 6,833,937 | B1 * | 12/2004 | Cholewo | H04N 1/6025 382/167 |

(Continued)

OTHER PUBLICATIONS

Cholewo, Tomasz J., Printer model inversion by constrained optimization, Proc. SPIE 3963, Color Imaging: Device-Independent Color, Color Hardcopy, and Graphic Arts V, (Dec. 21, 1999).

(Continued)

*Primary Examiner* — Scott A Rogers
(74) *Attorney, Agent, or Firm* — Dickinson Wright PLLC; Andrew D. Dorisio

(57) ABSTRACT

A data processing method, a system and a user interface are disclosed, for dosing ink in a digital printer with at least 6 ink channels. A forward transformation model is obtained or computed for defining a relationship between coordinates of device-dependent ink values across the ink channels and coordinates of device-independent colorimetric values in a color space. An inverse model of the forward transformation model is computed, wherein the inverse model comprises an adjustable constraint on each ink channel. One or more constraints are applied to each ink channel with predetermined and/or user-defined value(s). A target colorimetric value is input to the inverse model. An ink value is computed for each ink channel with the inverse model, wherein each computed ink value corresponds to ink dosage in its respective ink channel and the computed ink values collectively correspond substantially to the target colorimetric value.

11 Claims, 12 Drawing Sheets

(56) References Cited

U.S. PATENT DOCUMENTS

| | | | | |
|---|---|---|---|---|
| 7,057,765 B1* | 6/2006 | Fischer | ............... | H04N 1/603 |
| | | | | 358/1.9 |
| 7,245,395 B2* | 7/2007 | Couwenhoven | ......... | H04N 1/60 |
| | | | | 358/1.9 |
| 8,542,405 B2* | 9/2013 | Fischer | ............... | H04N 1/6061 |
| | | | | 358/1.9 |
| 8,610,952 B2* | 12/2013 | Fukuda | ............... | H04N 1/6033 |
| | | | | 358/1.9 |
| 8,625,160 B2* | 1/2014 | Hoshino | ............... | H04N 1/603 |
| | | | | 358/1.9 |
| 8,634,117 B2* | 1/2014 | Fukuda | ............... | H04N 1/6075 |
| | | | | 358/518 |
| 10,412,270 B2* | 9/2019 | Yamamoto | ........... | H04N 1/6044 |
| 11,521,029 B1* | 12/2022 | Martinez | ............... | G01N 21/31 |
| 2004/0109178 A1 | 6/2004 | Couwenhoven et al. | | |
| 2006/0170996 A1* | 8/2006 | Headley | ............. | B41F 33/0045 |
| | | | | 358/518 |
| 2010/0141972 A1* | 6/2010 | Yanai | ...................... | H04N 1/52 |
| | | | | 358/1.9 |
| 2019/0279054 A1* | 9/2019 | Morovic | ........... | H04N 1/00031 |

OTHER PUBLICATIONS

Bala, Raja, "Inverse problems in color device characterization," Proc. SPIE 5016, Computational Imaging, (Jul. 1, 2003).

\* cited by examiner

Fig. 4 [prior art]

SYSTEM AND METHOD FOR DOSING INK IN DIGITAL MULTICHANNEL PRINTERS

FIELD OF THE INVENTION

The present invention relates to color data processing techniques within colorimetric spaces for adjusting ink dosing in printing devices or systems with multiple ink channels.

BACKGROUND OF THE INVENTION

Digital printers with multiple ink channels have been rapidly adopted in the field of professional printing, as their ease of configuration through computer terminals and associated programs has substantially decreased the economical threshold for printed volumes, permitting ever more bespoke, ever smaller production runs. In this context, the task of color matching is usually carried out by a digital printing operator as an iterative process, attempting to match a printed result with a target color, bridging device-dependent colorimetric space(s) associated with the printer with conversions through a reference device-independent colorimetric space, a preferred example of which is the International Commission on Illumination ('CIE') Lightness, green-red and blue-yellow ('LAB') color space ('CIELAB').

A known workflow begins with the operator obtaining a table with a set of spot colors or target colors, which needs to be reproduced with a specific printer having multiple ink channels, e.g. cyan, magenta, yellow and black ('CMYK') or including even more, for instance Orange and Green ('CMYKOrGr') or more still with Violet ('CMYKOGV'). The printer has a distinct International color Consortium ('ICC') profile that contains information to convert a color from the CIELAB color space to the device color space, which for the printer is defined by the inks which it uses and reciprocally.

CIELAB values are obtained for each color in the table, and are input to a raster image processor ('RIP') computer program. The RIP program processes these target CIELAB values with the printer's ICC profile, whereby output values of each ink are computed as respective dosage in correspondence to the target CIELAB values. For example, with a target color of CIELAB values [14.191, 18.511, 4.177], the RIP program may propose that, for a CMYKOrGr printer, the respective ink values should be [50.196, 100, 100, 50.196, 50.196, 0].

The operator then prints a sample based on the computed ink values, and measures the actual CIELAB value of the sample with a spectrophotometer to check for color errors. The operator then invokes the RIP program to map a color gamut, the actual CIELAB value and the target CIELAB value. If the color match is satisfactory, the computed ink values are stored and the process can be restarted to match the next target color. In the printing industry, the color match is considered satisfactory when the color error CIEDE2000 (also abbreviated "$\Delta E00$") is as small as possible, wherein errors below 1 are deemed unnoticeable and errors between 1 and 2 are deemed noticeable to experienced observers. However, digital printers have a limited gamut of attainable colors, whereby CIEDE2000 errors above 2 can be considered satisfactory when the color is the best match which a printer can produce within its gamut.

Alternatively, when the color match is unsatisfactory, the operator accordingly attempts to estimate and correct which ink(s) value(s) should be modified relative to the last computed values; based on the difference between the actual CIELAB value of the sample and the target CIELAB value, and with the assistance of the printer color gamut map: the operator modifies the last computed ink(s) value(s) and prints a new sample; then measures the actual CIELAB value of that new sample to check for color errors again. Operators then engage in an iterative process, in which they modify ink values, print samples and check color accuracy, until the CIEDE2000 is desirably reduced to values below 2 or, for colors out of gamut, to as low a value as possible as possible colors.

The skilled person is aware of two main problems with the above approach, namely that RIP programs frequently output incorrect ink values, with $\Delta E00$ color errors that exceed 3; and that the color matching adjustment, based on eye estimation, is highly time-consuming. Attempts to mitigate these problems have been fraught by the fact that the relation between ink values and CIELAB values is complex and non-linear: a modification of the value for any ink channel produces a change in all three CIELAB values and, depending on the ink channel modified, this change can be larger or smaller. In addition to those problems, a limitation in the overall process is that an operator cannot easily obtain and select from many other inks separations, which may reproduce the same color CIELAB values, with different properties, in terms of opacity, graininess, amount of ink used, and more.

An improved method of dosing inks in multichannel printers, and a system implementing this method, are therefore desirable for mitigating at least some of the above shortcomings of the known prior art.

SUMMARY OF THE INVENTION

The present invention provides a method of dosing ink in multichannel printers, which automates substantially the adjustment workflow inherent to the task of color matching actual and target colorimetric values, through data processing functions with constrainable colorimetric factors.

According to an aspect of the present invention, there is provided a computer-implemented method for dosing ink in a digital printer with at least 6 ink channels, comprising the steps of obtaining or computing a forward transformation model defining a relationship between coordinates of device-dependent ink values across the ink channels and coordinates of device-independent colorimetric values in a color space; computing an inverse model of the forward transformation model, wherein the inverse model comprises an adjustable constraint on each ink channel; constraining each ink channel with a predetermined value; inputting a target colorimetric value to the inverse model; and computing an ink value for each ink channel with the inverse model, wherein each computed ink value corresponds to ink dosage in its respective ink channel and the computed ink values collectively correspond substantially to the target colorimetric value.

In an embodiment of the method, the adjustable constraint on each ink channel may be representative of whether ink dosage for the ink channel should be unaffected, minimized, maximized or set to a desired value.

An embodiment of the method may comprise the further steps of inputting the computed ink values as an ink vector to the forward transformation model for outputting a corresponding colorimetric value; computing an error value $E_{LAB}$ z that comprises the corresponding colorimetric error CIE76 value dLAB between the current CIELAB value and the target value in the color space, and comparing the calculated total error against a predetermined tolerance value.

An embodiment of the method may comprise the further step of clipping each computed ink value, which exceeds a gamut capacity of the digital printer, within a range of values representative of the digital printer gamut.

In a variant of either embodiments, when the calculated error $E_{LAB\ Z}$ exceeds a predetermined tolerance value, the method may comprise the further steps of scaling the computed colorimetric error dLAB if its value is above a predefined threshold values $Th_{LAB}$; computing a Jacobian matrix for the current ink vector and a pseudoinverse of the Jacobian matrix; computing a differential ink vector with the pseudoinverse Jacobian matrix on the scaled dLAB value; and updating the computed ink values according to the computed differential ink vector.

In a variant of the embodiment above, the method may comprise the further steps of projecting a function of the inks' values to be optimized Z in a Null space of the computed Jacobian matrix for outputting an additional differential ink vector, wherein the step of calculating the error value $E_{LAB\ Z}$ is based on both the corresponding colorimetric error CIE76 value dLAB and the value of the function Z; the step of scaling the function Z if its value is above a predefined threshold $Th_Z$; and the step of computing the differential ink vector further comprises computing the differential ink vector based on both the scaled dLAB value and the scaled function Z.

In a further variant of the two variants above, the method may comprises the further step of setting the adjustable constraint on at least one ink channel to a desired value without changing the CIELAB values.

An embodiment of the method may comprise the further step of printing a sample according to the computed ink values. Variants of this embodiment may include further steps of assessing the colorimetric error CIEDE2000 numerically, and visually by considering one or more factors including opacity, color saturation and graininess.

According to another aspect of the present invention, there is also provided a set of instructions recorded on a data carrying medium or stored at a network storage medium which, when read and processed by a data processing terminal, configures that terminal to perform the steps of any of the embodiments of the method described herein.

According to a further aspect of the present invention, there is also provided a digital printing system comprising a digital printer with at least 6 ink channels, a data processing terminal internal to or operably interfaced with the digital printer, an embodiment of the set of instructions as described herein and stored at either the printer or the terminal, and means for inputting at least the target colorimetric value.

According to yet another aspect of the present invention, there is also provided a user interface for output on display means of either the data processing terminal or the digital printing system configured by an embodiment of the set of instructions as described herein, comprising user-interactable means for inputting at least the target colorimetric value.

An embodiment of the user interface may further comprise user-interactable means for constraining each ink channel with a user-selected value.

An embodiment of the user interface may further comprise user-interactable means for constraining one or more within the set of lightness, green-red color and blue-yellow color component values with a respective user-selected value.

For any of the above embodiments, the color space is preferably the International Commission on Illumination ('CIE') Lightness, green-red and blue-yellow ('LAB') color space, whereby each colorimetric value is a set of lightness, green-red color and blue-yellow color component values.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Figure 1:
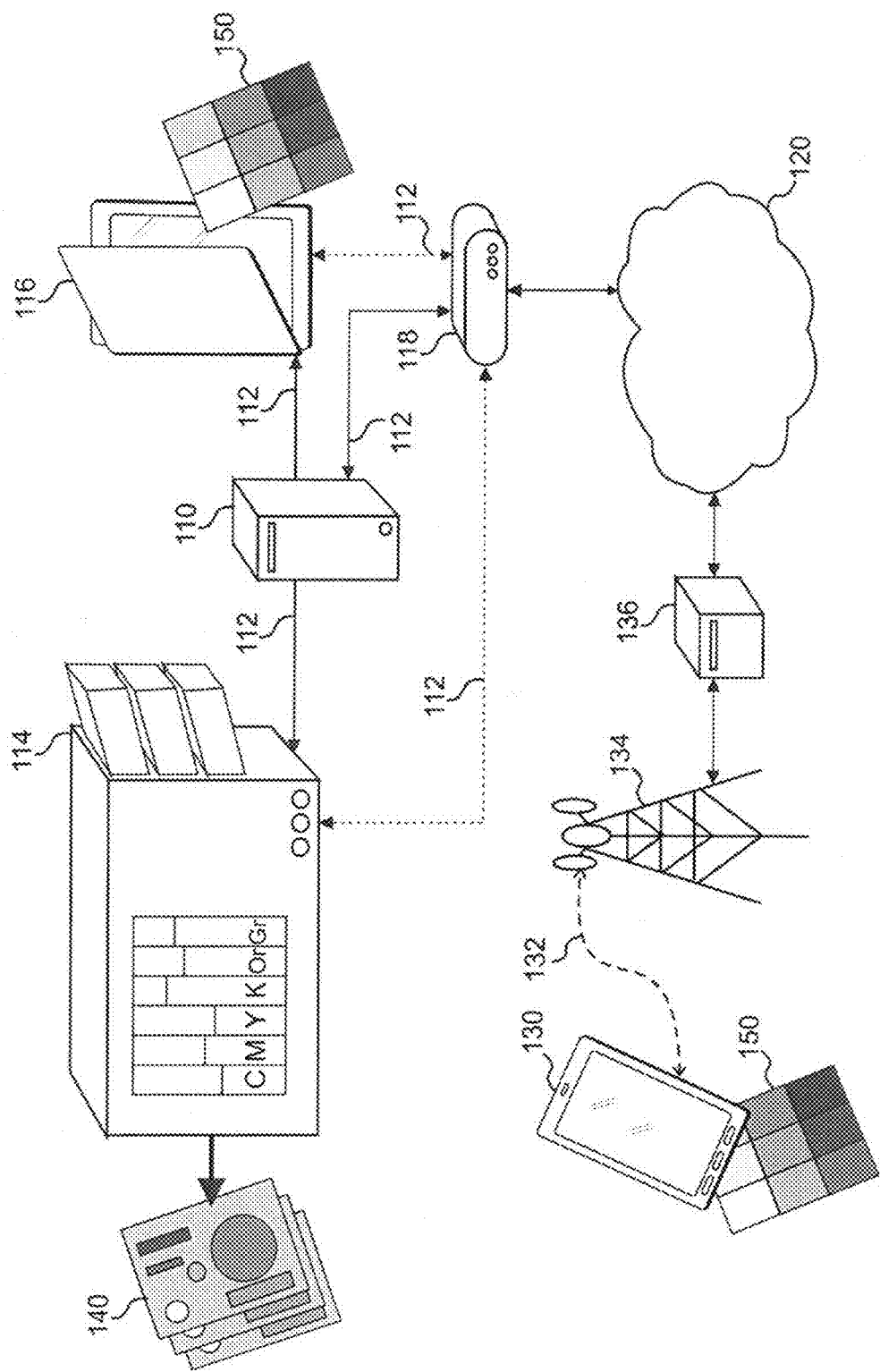
FIG. 1 is a hardware diagram of a digital printing system in a networked environment, configurable according to the invention, including a local data processing terminal interfaced with a digital multichannel color printer, a remote data processing terminal, and a table of spot colors.
Figure 2:
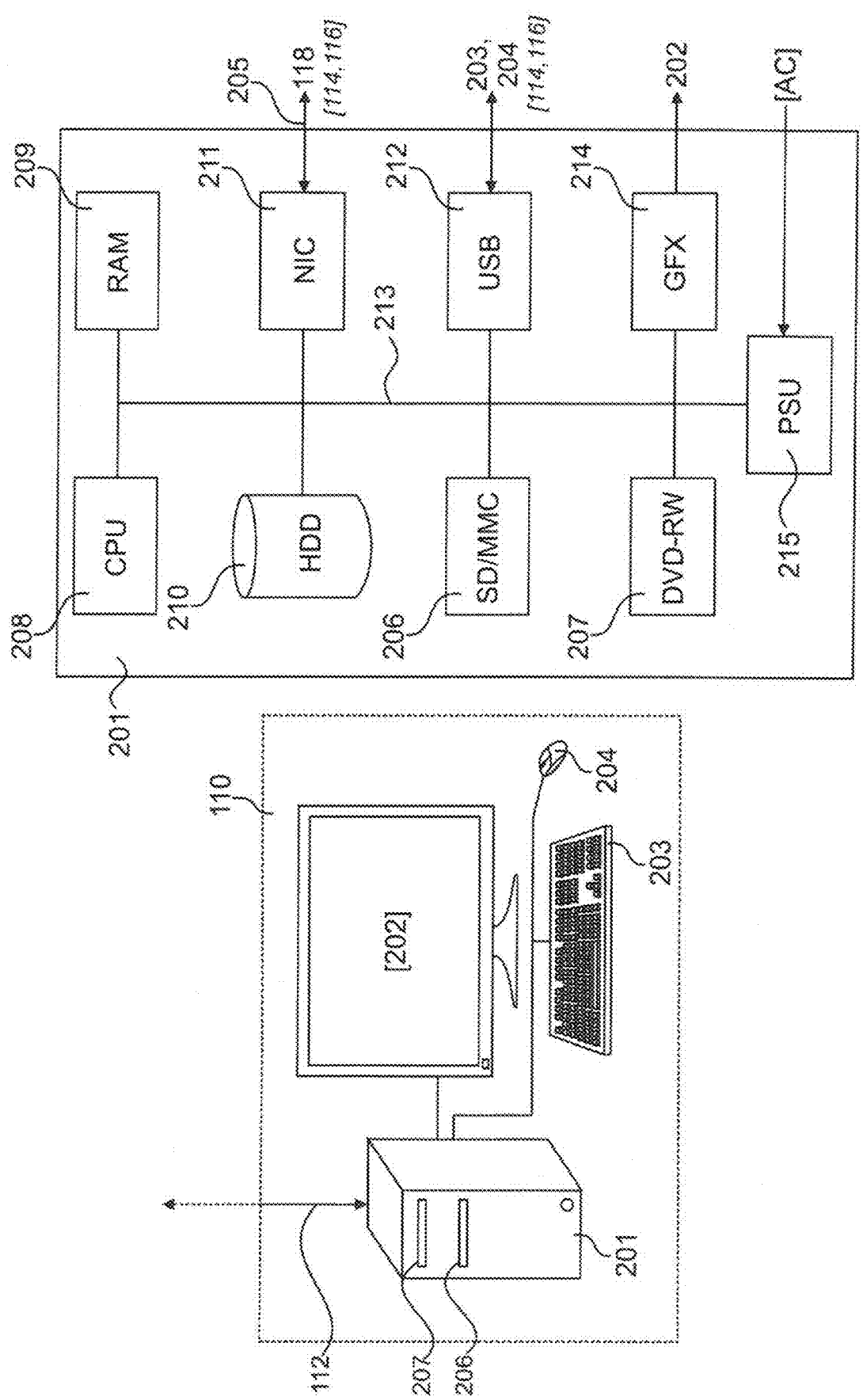
FIG. 2 is a simplified diagram of a typical hardware architecture of the local data processing terminal shown in FIG. 1, including a processor and memory means storing a set of data processing instructions.
Figure 3:
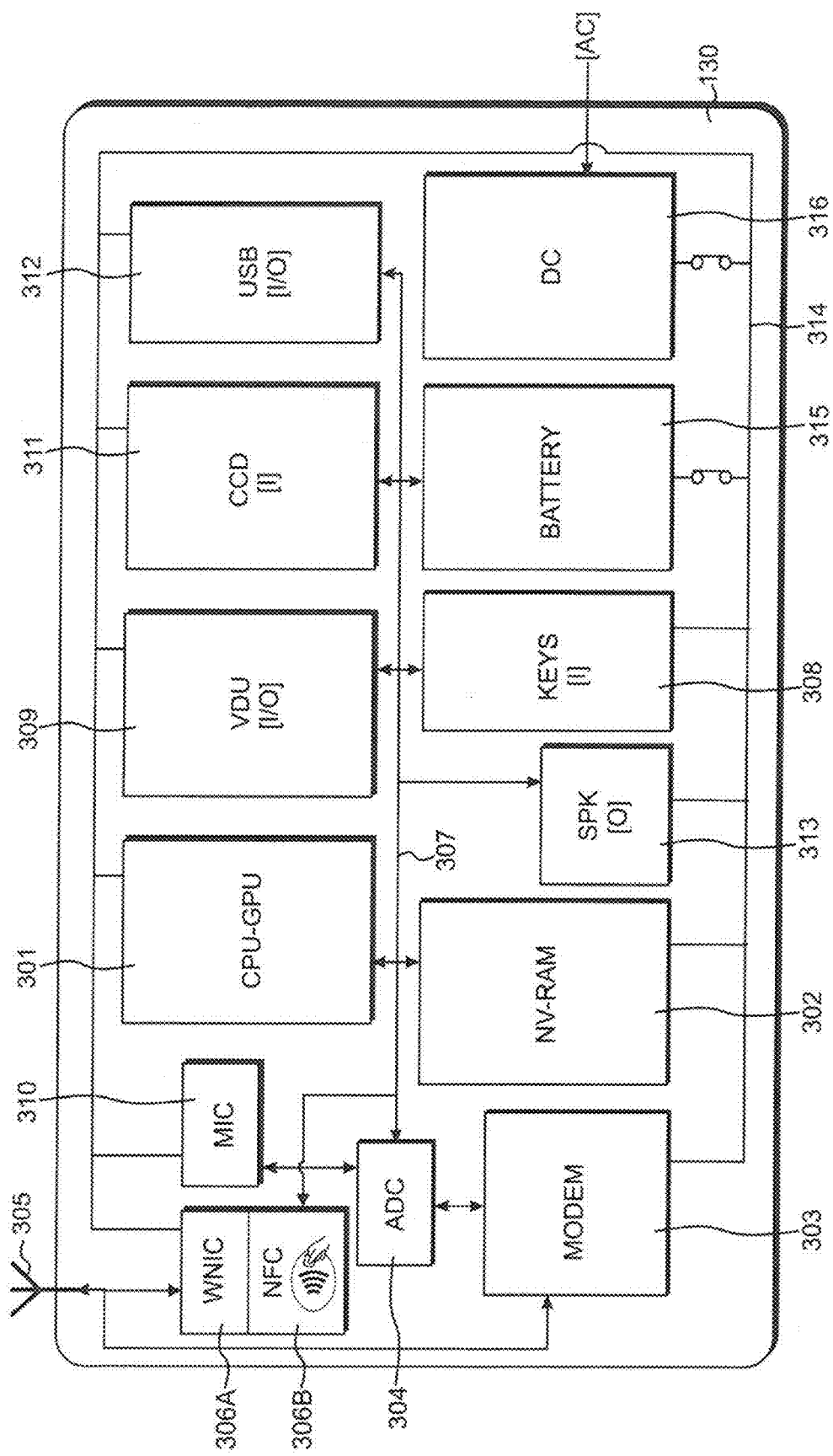
FIG. 3 is a simplified diagram of a typical hardware architecture of the remote data processing terminal shown in FIG. 1, including a processor and memory means.

Referring now to the Figures and initially FIGS. 1 to 3, an example of a digital printing system 100 is shown, which is configurable with embodiments of the data processing method of the invention. The digital printing system 100 includes a data processing terminal 110 locally interfaced, through one or more high-bandwidth data connections 112, with a digital multichannel color printer 114, in the example an inkjet printer with 6 color channels (e.g. CMYKOrGr), and with a digital spectrophotometer 116.

The digital printing system 100 is located within a networked environment, wherein the data processing terminal 110 is a personal computer device which emits and receives data encoded as digital signals over high-bandwidth wired or wireless data connections 112, wherein such signals are relayed respectively to or from the computer 110 by a local router device 118 implementing a wired local network operating according to the IEEE 802.3-2008 Gigabit Ethernet transmission protocol and/or a high-bandwidth wireless local network operating according to the IEEE 802.11 Wi-Fi wireless transmission protocol.

A typical hardware architecture of the computer 110 is shown in FIG. 2 in further detail, by way of non-limitative example. The computer is configured with a data processing unit 201, data outputting means such as video display unit (VDU) 202, data inputting means such as HID devices, commonly a keyboard 203 and a pointing device (mouse) 204, as well as the VDU 202 itself if it is a touch screen display, and data inputting/outputting means such as the wired or wireless network connection 112 to local and wide area networks via the router 118, a magnetic data-carrying medium reader/writer 206 and an optical data-carrying medium reader/writer 207.

Within the data processing unit 201, a central processing unit (CPU) 208 provides task co-ordination and data processing functionality. Sets of instructions and data for the CPU 208 are stored in memory means 209 and a hard disk storage unit 210 facilitates non-volatile storage of the instructions and the data. A wireless network interface card (NIC) 211 provides the interface to the network connection 112 with the router 118. One or more universal serial bus (USB) input/output interfaces 212 facilitate connection to the keyboard and pointing devices 203, 204. Subject to the presence or absence of network connectivity features in the printer 114 and the spectrophotometer 116, data communications between the computer 110, the printer 114 and the spectrophotometer 116 may be routed through the router device 118, or through wired connections to the computer's USB interfaces 212.

All of the above components are connected to a data input/output bus 213, to which the magnetic data-carrying medium reader/writer 206 and optical data-carrying medium reader/writer 207 are also connected. A video adapter 214 receives CPU instructions over the bus 213 for outputting processed video data to VDU 202. All the components of data processing unit 201 are powered by a power supply unit 215, which receives electrical power from a local mains power source and transforms same according to component ratings and requirements.

The router 118 is itself connected to a wide area network, an example of which is the Internet 120, via a conventional ADSL or optical fiber connection and through which digital data may be emitted to and received from remote data processing terminals. Network connectivity and interoperable networking protocols of each data processing terminal allow the terminals to connect to one another and communicate data to and receive data from one another according to certain embodiments the methodology described herein.

An example remote data processing terminal is a mobile personal communication device 130 which emits and receives data, including voice and/or alphanumerical data, encoded as a digital signal over a wireless data transmission 132, wherein the signal is relayed respectively to or from the device 130 by the geographically-closest communication link relay 134 of a plurality thereof. The plurality of communication link relays $134_{1-N}$ allows digital signals to be routed between mobile devices $130_{1-N}$ and their counterpart by means of a remote gateway 136. Gateway 136 is for instance a communication network switch, which couples digital signal traffic between wireless telecommunication networks, such as the network within which wireless data transmissions 132 take place, and the WAN 120.

A typical hardware architecture of the mobile personal communication device 130 is shown in FIG. 3 in further detail, by way of non-limitative example. The mobile device 130 firstly includes a data processing unit 301, for instance a general-purpose microprocessor, for instance conforming to the Cortex™ architecture manufactured by ARM™, acting as the main controller of the data processing terminal 130 and which is coupled with memory means 302, comprising volatile random-access memory (RAM), non-volatile random-access memory (NVRAM) or a combination thereof.

The mobile device 130 further includes networking means. Communication functionality is provided by a modem 303, which provides the interface to external communication systems, such as the cellular telephone network shown in FIG. 1, associated with or containing an analogue-to-digital converter 304, which receives an analogue waveform signal through an aerial 305 from the communication link relay 134 and processes same into digital data with the data processing unit 301 or a dedicated signal processing unit. Alternative wireless communication functionality is provided by a wireless network interface card (WNIC) 306A interfacing the mobile device 130 with any wireless local area network generated by a local wireless router 118. Further alternative wireless communication functionality is provided by a High Frequency Radio Frequency Identification (RFID) networking interface 306B implementing Near Field Communication (NFC) interoperability and data communication protocols for facilitating wireless data communication over a short distance with correspondingly-equipped devices.

The CPU 301, NVRAM 302 and networking means 303 to 306B are connected by a data input/output bus 307, over which they communicate and to which further components of the mobile device 130 are similarly connected in order to provide wireless communication functionality and receive user interrupts, inputs and configuration data. Accordingly, user input may be received from a data input interface 308, which for the mobile device 130 may be a keypad with a limited number of multi-functional keys and/or a capacitive or resistive touch screen feature of the display unit 309. Further input data may be received as analogue sound wave data by a microphone 310, digital image data by a digital camera lens 311 and digital data via a Universal Serial Bus (USB) 312. Processed data is output as one or both of display data output to the display unit 309 and audio data output to a speaker unit 313.

Power is supplied to the above components by the electrical circuit 314 of the mobile device 130, which is interfaced with an internal battery module 315, which itself may be recharged on an ad hoc basis by an electrical converter 316.

The digital printing system 100 outputs printed products 140, wherein the accuracy of color reproduction by the printer 114 in output printed products 140 is paramount. Accordingly a table 150 of spot or target colors is provided to help calibrate color reproduction by the printer 114 with the data processing terminal 110, through the process known in the art as color matching.

Figure 4:
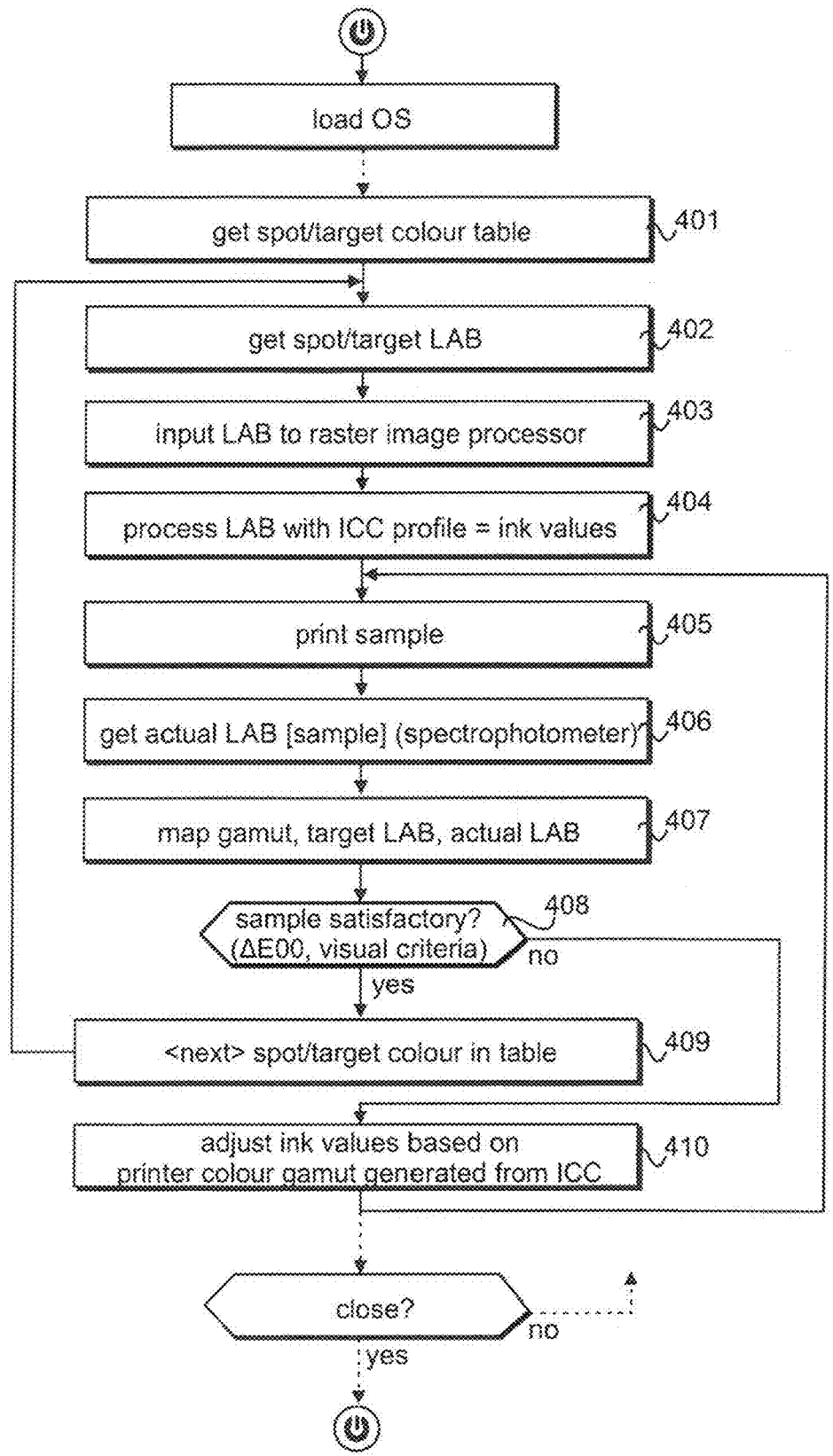
FIG. 4 illustrates steps of a method of the prior art for matching colors with the system of FIG. 1.

With reference to FIG. 4 now, color matching with the system 100 has typically been performed as an iterative trial-and-error process. Further to switching the computer 110 on, loading its operating system and then a raster image processor (RIP) application, the prior art method is initiated by obtaining the table 150 of spot or target colors for a printing job at hand at step 401. CIELAB values of a first color in the table are obtained at step 402, representative of the targeted printed color. The CIELAB values are input to the RIP application at step 403, which processes the input CIELAB values with the ICC profile specific to the printer 114 as a forward transformation function at step 404.

A device forward model defines the relationship between device-dependent coordinates, such as ink values for a printer or RGB values for a screen, and device-independent coordinates, such as CIELAB, CIELCH, CIEXYZ values in respective color spaces. In the specific case of a printer, a printer forward model computes the CIELAB values that a given set of ink values will produce, reciprocally a printer inverse model computes the required ink values to obtain given CIELAB values. For the printer forward model, a common approach uses a data fitting or interpolation method to generate a function from the characterization samples, for generating a regular lattice of points and building a color Look-Up Table ("CLUT"), for instance a 16×16×16 CIELAB grid, whence a fast interpolation technique is then applied when processing an image through the RIP application.

Step 404 yields a first respective dosage for each of the 6 ink channels to reproduce the targeted first color whereby, at a next step 405, a first sample is then printed by the printer 114 according to that first dosage. Actual CIELAB values of the first color as reproduced in the first sample according to the first dosage are next obtained with the spectrophotometer 116 at step 406, wherein the RIP application is then able to plot the target CIELAB values and the actual CIELAB values in a gamut map at step 407.

A question is then asked at step 408, about whether the first color as reproduced in the first sample amounts to a satisfactory color match relative to the targeted printed color of step 402. Satisfaction criteria include a measured color error CIEDE2000 of desirably less than 1, or alternatively less than 2 if the color is within the printer gamut limits. Other visual criteria can also be considered like the opacity, graininess, amount of ink used, etc. When the question of step 408 is answered positively, the next color in the table 150 is selected at step 409 and control returns to step 402, wherein the CIELAB values of that next color may be obtained, and the sequence of step 403 to 408 repeated.

Alternatively, when the question of step 408 is answered negatively, then at step 410 the user of the RIP application at terminal 110 adjusts the ink values provided by the ICC profile according to the gamut map manually, yielding second respective dosage for each of the 6 ink channels to try and better reproduce the targeted first color. Control then returns to step 405 for printing a second sample by the printer 114 according to that second ink dosage and repeating the sequence of steps 406 to 408, until such time as an ink dosage is found that allows the question of step 408 to be answered positively.

Clearly, the iterative and manually-driven approach of this prior art method of dosing ink in the printer 114 through color-matching is sub-optimal and wasteful. The present invention improves upon the prior art technique with a method of dosing ink in the printer 114, through an improved color-matching approach which, in a first embodiment described with reference to FIG. 5 herein, automatically provides an optimised initial set of ink values for obtaining the targeted CIELAB values. This initial set of ink value is optimized according to one or more user-specified constraints, for instance wherein one amongst the 6 ink channels of the printer 114 can be minimized whereas the others are maximized. In this way, the operator can find other ink dosages that reproduce the same target color.

To propose optimized initial ink values to the user based on a desired CIELAB value, a printer inverse model has to be used: contrary to the forward model, which defines CIELAB values as a function of ink values, the inverse model defines ink values as a function of CIELAB values.

In the case of printers with 4 or more colorants like CMYK, CMYKOrGr or CMYKOGV printers, the dimension of the device dependent coordinates (number of inks channels) is greater than the dimension of the device independent coordinates (CIELAB values). Thus it can be said that the system is redundant, because many combinations of ink values produce the same CIELAB colorimetric value, whereby the problem is ill posed and the only way to solve it is to apply constraints to the model.

A printer inverse model is already implemented in ICC files through a table that relates ink dosages to CIELAB values, but which shows one of the main limitations of the standard ICC-based technique: operators have only one solution at their disposal when facing the color matching problem. Moreover, they cannot know which constraints were applied on the solver when finding the ink values that produce a CIELAB value. The ICC-based solution may have been optimized to maximize use of the black ink, or maybe it was optimized to maximize use of the secondary orange or green channels.

In terms of the error for the inverse model, it has been shown in literature that the mean CIEDE2000 error is larger for the inverse model, at between 2 and 4 overall, than for the forward model, at between 1 and 2 overall. This explains another aspect of the trial-and-error problem which operators face, whenever they use the RIP application to compute ink values for obtaining a target CIELAB value: they start at a level of error, which is noticeable by even inexperienced observers.

It is desirable to be able to choose the constraints to apply for every different case, for instance because, for some substrates or colors, it may be preferable to maximize or minimize certain colors. Therefore the present method allows the user to select constraints to apply, and so to choose optimization parameters when color matching a given CIELAB value.

A general solution to determine the inverse model is through explicit constrained inversion, which consists of finding all the sets of ink combinations that produce a given LAB (CIE color space) value, wherein one is selected which satisfies a series of constraints, examples of which include: total colorant area coverage (i.e., C+M+Y+K+O+G) is less than a threshold; the amount of K with respect to the minimum and maximum K that can produce the given color is constrained; stability is maximized (i.e., change in colorant values results in minimum change in CIE color); smoothness is maintained with respect to neighboring colors in CIE color space; gamut volume is maximized; spatial artifacts such as misregistration and moire are minimized or constrained.

On the basis of the above general principles, the printer forward model in the present method can be stated as:

$$LAB = f(INK, p_{fw})$$

wherein f is a vector function defining the printer forward model and is nonlinear; LAB is a vector containing three CIELAB colorimetric values, with L as a lightness value, A as a value along the green-red axis and B as a value along the blue-yellow axis; INK is a vector containing the N-Ink channels, in the example the 6 channels of the printer 114, and $p_{fw}$ are parameters of the printer forward model. In an embodiment, f may be implemented based on the ICC CLUT table.

The printer inverse model can thus be formulated as: $INK = g(LAB, p_{inv})$ wherein g is a vector function defining the printer inverse model and $p_{inv}$ are the parameters of the printer inverse model. For the printer inverse model, the g function represents an optimization problem, the goal of which is to find the INK vector that reproduces the given CIELAB values given in the LAB vector. This is normally done through the minimization of a cost function E defined by a difference error function subjected to certain constraints. In this embodiment, the cost function includes an additional term that allows to maximize, minimize or set to a desired value one or multiple ink channels. Two constraints are considered: a first to limit all the ink channels values to the printer limits, and a second to limit the total amount of ink which can be used. These two constraints are expressed as penalty functions and added to the cost function E.

The resulting general expression for the printer inverse model can thus be stated as follows:

$$INK_{sol} = {}_{INK}^{argmin} E(f(INK, p_{fw}), LAB_{targ}, flag_{INK}, INK_{des})$$

wherein $INK_{sol}$ is the solution INK vector that minimizes the function E; E is a function that defines the cost function to minimize; $LAB_{targ}$ is the vector with the target CIELAB values to obtain; $flag_{INK}$ is a vector of flags that indicate if a given ink channel should be unaffected (1), minimized (2), maximized (3) or set to a desired value (4) during the optimization process; and $INK_{des}$ is a vector that contains the desired ink values that every ink channel in the solution $INK_{sol}$ should have.

As a result, the cost function E is composed of 4 terms. The first term is the color difference error, the second and third terms are the penalty functions associated to the physical gamut and the total area coverage constraints, and the fourth term is the desired ink error function. This can be expressed as:

$$E(f(INK, p_{fw}), LAB_{targ}, flag_{INK}, INK_{des}) = E_{CIELCH}(f(INK, p_{fw}), LAB_{targ}) S_{gam} E_{gam}(INK) + S_{TAC} E_{TAC}(INK) + E_{INK}(INK, flag_{INK}, INK_{des})$$

The most important component of the cost function E is the color difference error function $E_{CIELCH}$. This function computes the difference between the current CIELAB values obtained using the current INK vector and the target CIELAB values $LAB_{targ}$. Gamut mapping is easier to process in the CIE Lightness-Chroma-Hue (CIELCH) color space so the CIE LCH E76 error is used. To avoid the problem of the hue angle discontinuity, the CIE LCH E76 error is expressed as a function of the CIELAB values, which results in:

$$E_{CIELCH}(LAB, LAB_{targ}) = E_{CIELCH}(f(INK, p_{fw}), LAB_{targ}) = \tfrac{1}{2}(S_L(L-L_{targ})^2 + S_C(C-C_{targ})^2 + S_H(H-H_{targ})^2) = \tfrac{1}{2}(S_L(L-L_{targ})^2 + S_C(C-C_{targ})^2 + S_H(C \cdot C_{targ} - A \cdot A_{targ} - B \cdot B_{targ}))$$

wherein L, C, H are respectively lightness, chroma and hue values; the chroma and hue values are expressed in function of the A and B values as $C = \sqrt{A^2 + B^2}$ and $H = \arctan B/A$; the values without subindex correspond to the current INK vector; the values with the 'targ' sub-index correspond to the target CIELAB value; and SL, SC, SH are respective weight factors for each of the CIELCH errors, with values for instance set as SL=SH=1 and SC=0.1 to emulate a clipping effect for out-of-gamut values.

The constraints for the optimization problem are expressed as penalty functions. There are two important constraints in the problem: the physical gamut and the total area coverage. The goal of the penalty function is to penalize a given function whenever a condition is violated. For a cost function to minimize in an optimization problem, this means that the penalty function should increase the value of the cost function whenever the condition is violated. If the condition is respected, then the penalty function should not do anything. In the example embodiment, a bicubic penalty function is used, which is expressed as:

$$p(x) = \begin{cases} 0 & \text{if } 0 \le x \le 1 \\ (|2x-1|^3 - 1)^3 & \text{otherwise} \end{cases}$$

The function p(x) outputs 0 as long as x is in the range [0,1], while it rises very quickly as soon as the value of x goes out of that range. The value of "x" is replaced is to be replaced by the constraint function to apply in the optimization problem.

For the physical gamut constraint, the ink values of each ink channel are limited to the range from 0 to 1. This can be expressed as:

$$0 \le INK_i \le 1$$

Wherein $INK_i$ denotes the i-th component of the current ink vector INK for a printer composed of N-ink channels. For example in a CMYKOrGr printer, i goes from 1 to 6.

Mathematically, the physical gamut constraint function $E_{gam}$ is expressed as follow:

$$E_{gam}(INK) = \sum_{i=1}^{N} p(INK_i)$$

For the total area coverage, different colors can be generated only when the maximum total area coverage is below the maximum value, and other reasons to limit the total area coverage can be paper wrinkling and soaking for inkjet printers, poor fussing of thick layers for laser printers, and more. The total area average constraint for a printer with N-ink channels can be expressed as:

$$\sum_{i=1}^{N} INK_i \le TAC$$

wherein TAC is the maximum total area coverage permissible.

Expressed in terms of the penalty function p(x), the total area coverage constraint function $E_{TAC}$ is given by:

$$E_{TAC}(\text{INK}) = p\left(\frac{1}{TAC}\left(\sum_{i=1}^{N} INK_i\right)\right)$$

wherein the TAC value may be set empirically, for example at 2.7, equivalent to 270% in percentage.

The desired ink error function is used to maximize, minimize or set to a desired value one or multiple ink channel. The desired ink error function $E_{INK}$ computes the difference between the current inks vector INK and a vector of desired ink values $INK_{des}$. Mathematically this can be expressed as:

$$E_{INK}(\text{INK}, flag_{INK}, INK_{des}) = \sum_{i=1}^{N} \frac{1}{2} S_{INK\ i}(INK_i - INK_{des\ i})^2$$

wherein $INK_{des\ i}$ is the i-th component of the desired ink vector $INK_{des}$ and $S_{ink\ i}$ is the i-th component of the vector of weights $S_{INK}$ to apply on each ink channel.

The values of the desired ink vector $INK_{des}$ control the values which the solution vector $INK_{sol}$ will have. To maximize the value of the ink channel $INK_{sol\ i}$, $INK_{des\ i}$ is set to 1. Otherwise, $INK_{des\ i}$ is set to 0 to minimize, or set to x for forcing the ink channel to have a value of x in the solution. These conditions are flexible, because it is not possible to attain a specific desired ink value $INK_{des\ i}$. In particular, for the maximizing and minimizing cases, it is better to consider them as guiding values. Therefore in such cases, the respective weight factor $S_{ink\ i}$ is adjusted so as not to strongly enforce this condition. To actually try to find an ink solution $INK_{sol}$ for which an ink channel has a desired value $INK_{des\ i}$, the weight factor $S_{ink\ i}$ is increased to force this condition in the solution. Alternatively, the weight factor $S_{ink\ i}$ can be set to 0 to remove any condition upon it.

An additional factor to consider overall is the vector of initial conditions $INK_{ini}$. It is well known that optimization algorithms tend to stick at the first local minima which the algorithm finds. Therefore the solution found strongly depends upon the vector of initial conditions $INK_{ini}$. On that basis, a vector of flags $flag_{INK}$ is used for adjusting the values of the vectors $INK_{des}$, $S_{INK}$ and $INK_{ini}$ according to the desired behavior. Depending on the flag value associated to each ink channel $flag_{INK\ i}$, the values of those vectors are modified according to:

$$flag_{INK\ i} = \begin{cases} 1 & S_{INK\ i} = 0 & INK_{ini\ i} = x & INK_{des\ i} = y \\ 2 & S_{INK\ i} = 1 & INK_{ini\ i} = 0.001 & INK_{des\ i} = 0 \\ 3 & S_{INK\ i} = 1 & INK_{ini\ i} = 0.999 & INK_{des\ i} = 1 \\ 4 & S_{INK\ i} = 10 & INK_{ini\ i} = x & INK_{des\ i} = x \end{cases}$$

Thus, when $flag_{INK\ i}=1$, no condition is imposed upon the ink channel. This is enforced by setting the respective weight factor $S_{ink\ i}$ to 0, which makes the desired ink value $INK_{des\ i}$ irrelevant and so set to a given value y. The initial ink value $INK_{ini\ i}$ still has an effect in the solution, whence it can be set to a given value x. Three suggested values are available to the user: use ink values given by the user (1), use random values (2) or use ink values that the ICC printer profile computes for the target CIELAB values (3).

When $flag_{INK\ i}=2$, the ink channel value is to be minimized, thus the desired ink value $INK_{des\ i}$ is set to 0. To make this condition flexible, the weight factor $S_{ink\ i}$ is set to 1. In addition, the initial ink value $INK_{ini\ i}$ is set close to 0, to help the solver converge towards a solution close to the desired ink value $INK_{des\ i}$.

When $flag_{INK\ i}=3$, the ink channel value is to be maximized, thus the desired ink value $INK_{des\ i}$ is set to 1. This condition is also flexible, wherein the weight factor $S_{ink\ i}$ is again set to 1. The initial ink value $INK_{ini\ i}$ is set close to 1 to help the solver converge towards the desired solution.

When $flag_{INK\ i}=4$, the ink channel should have a certain value x in the solution vector $INK_{sol}$, whereby the desired ink value $INK_{des\ i}$ is set to x. In addition, the weight factor $S_{ink\ i}$ is set to 10 to make this condition stricter, but still exhibiting some flexibility. The initial ink value $INK_{ini\ i}$ is set to the desired value x to help the solver converge towards the desired solution.

This first embodiment of the method thus solves a constrained optimization problem, to find the set of ink values that produce certain CIELAB values with certain desired constraints applied. A main cost function to minimize is used, with the problem constraints converted into penalty functions that are added to the main cost function in order to use algorithms suitable for unconstrained problems, thus reducing the computational complexity. The cost main function finds a solution which minimizes the CIE LCH E76 error while respecting the physical gamut and total area average constraints. An additional error function, designated as the desired ink error function, is added to the main cost function which allows to minimize, maximize or set to a desired value one or multiple ink channels.

Figure 5:
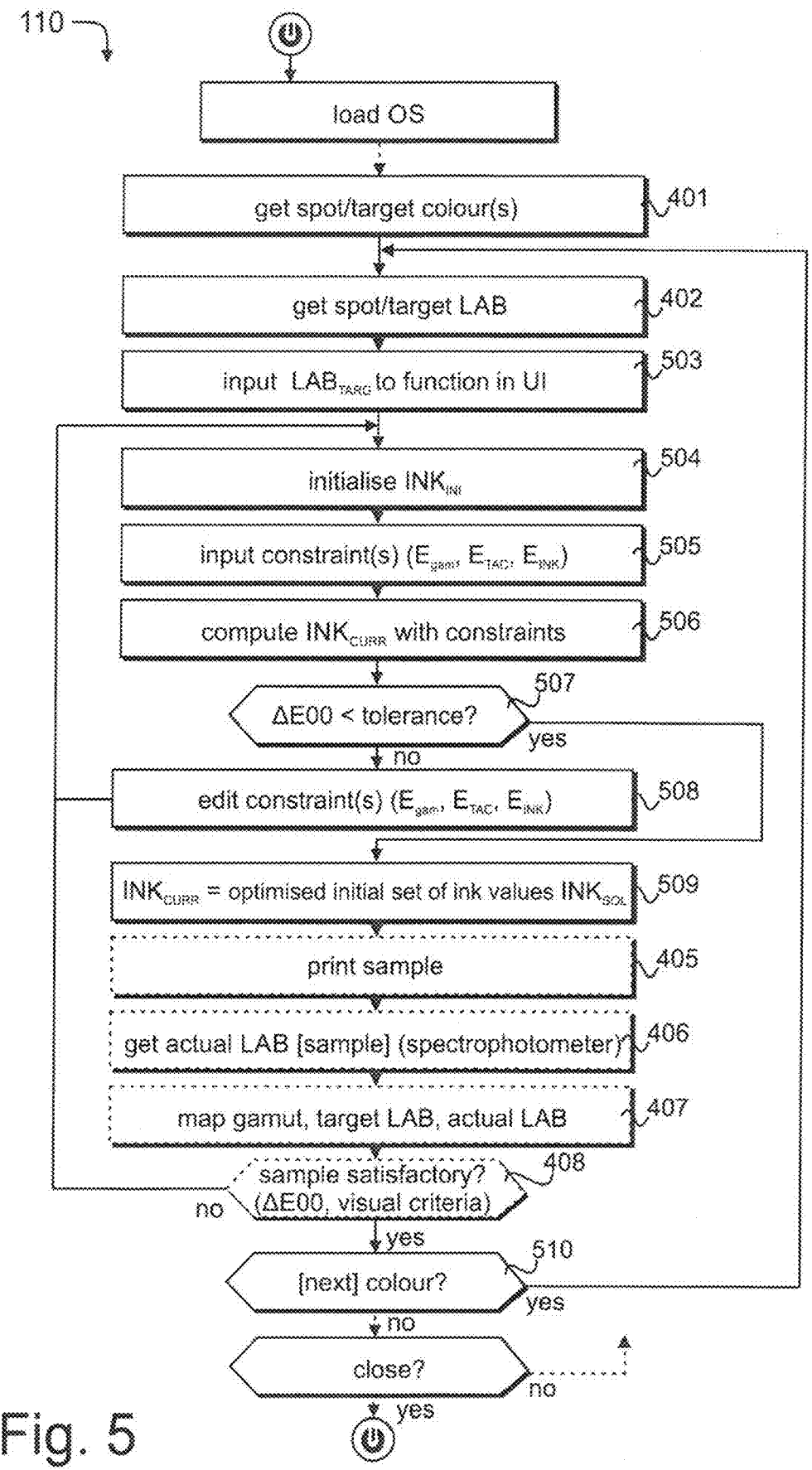
FIG. 5 illustrates steps of a first embodiment of a method according to the invention for matching colors and dosing ink in the system of FIG. 1.

With reference to FIG. 5 now, accordingly a first embodiment of a method of color matching to dose ink in the multichannel printer 114 according to the invention is described, the purpose of which is to find a set of ink values $INK_{sol}$ corresponding to respective dosage of each ink channel in the printer 114, which produces the target CIELAB vector $LAB_{targ}$.

Further to switching the computer 110, loading its operating system and then a set of instructions embodying the following method, the table 150 of spot or target colors for the printing job at hand is obtained again at step 401. CIELAB values of a first color in the table are obtained at step 402, representative of the targeted printed color $LAB_{targ}$.

At step 503, the user of the computer 110 inputs CIELAB data corresponding to the obtained targeted printed color $LAB_{targ}$, in a user interface of a set of instructions embodying the above-described color and ink data processing techniques that is processed by the computer 110.

At step 504 the set of ink values $INK_{ini}$ is initialized to: ink values given by the user (1), random values (2) or ink values that the ICC printer profile computes for the target CIELAB values (3). At step 505, the user of the computer 110 inputs data corresponding to one or more constraints of the color difference error function in the user interface, such as physical gamut value, total area coverage value, ink(s) channel(s) minimization or maximization. At step 506, the set of ink values corresponding to the first vector $INK_{curr}$ that produces the target CIELAB colorimetric values $LAB_{targ}$ is computed by solving the constrained optimization problem as previously described, thus including the cost function E as constrained either by default and/or by the user input data of step 505.

A question is then asked at step 507, about whether the computed error CIEDE2000 between the target color CIELAB values $LAB_{targ}$ and the current one $LAB_{curr}$ produced by the ink dosage $INK_{curr}$ computed at step 506 is below tolerance value, for example 1. When the current error CIEDE2000 exceeds the given tolerance value, then at step 508 the user of the computer 110 may input alternative or further data corresponding to one or more constraints of the color difference error function in the user interface, whence control returns to step 504 for re-computing the set of ink values that best reproduce the target CIELAB value $LAB_{targ}$, until such time as the question of step 507 is answered positively. In addition, the user may initialize the ink values $INI_{ini}$ to different values at step 504 that can help to find a better solution or find a different ink dosage that produce the same target CIELAB value $LAB_{targ}$.

When the question of step 507 is answered positively, then at step 509 the latest vector $INK_{curr}$ is declared a satisfactory solution, i.e. an initial set of optimized ink values $INK_{sol}$ corresponding to respective dosage of each ink channel in the printer 114, which produces substantially the targeted CIELAB value $LAB_{targ}$. Optionally, a sample may then be printed (405) with the printer 114, with having its ink channels dosed according to the initial set of optimized ink values $INK_{sol}$. Optionally still, the color may be controlled physically per steps 406 to 408. If the printed sample is not deemed satisfactory, the user may restart the process from step 504 to find a different ink dosage which produces the target color. In a variant of step 509, should any of the ink values in the set $INK_{sol}$ lie outside of the printer gamut, then such values may usefully be clipped to a range representative of the printer gamut, e.g. [0,1].

So long as one or more color(s) remain in the table 150 of spot or target colors, for which the CIELAB values need to be targeted and then an initial set of optimized ink values $INK_{sol}$ computed, a question asked at step 510 is answered positively for returning control to step 402, at which CIELAB values of the next color in the table are obtained, representative of the next-targeted printed color values $LAB_{targ}$. The algorithm cycles until all colors in the table 150 of spot or target colors have been processed. at which time the printer 114 may output printed products 140 according to the computed initial sets of optimized ink values $INK_{sol}$, substantially faster and with improved initial color accuracy relative to techniques of the prior art.

Figure 6:
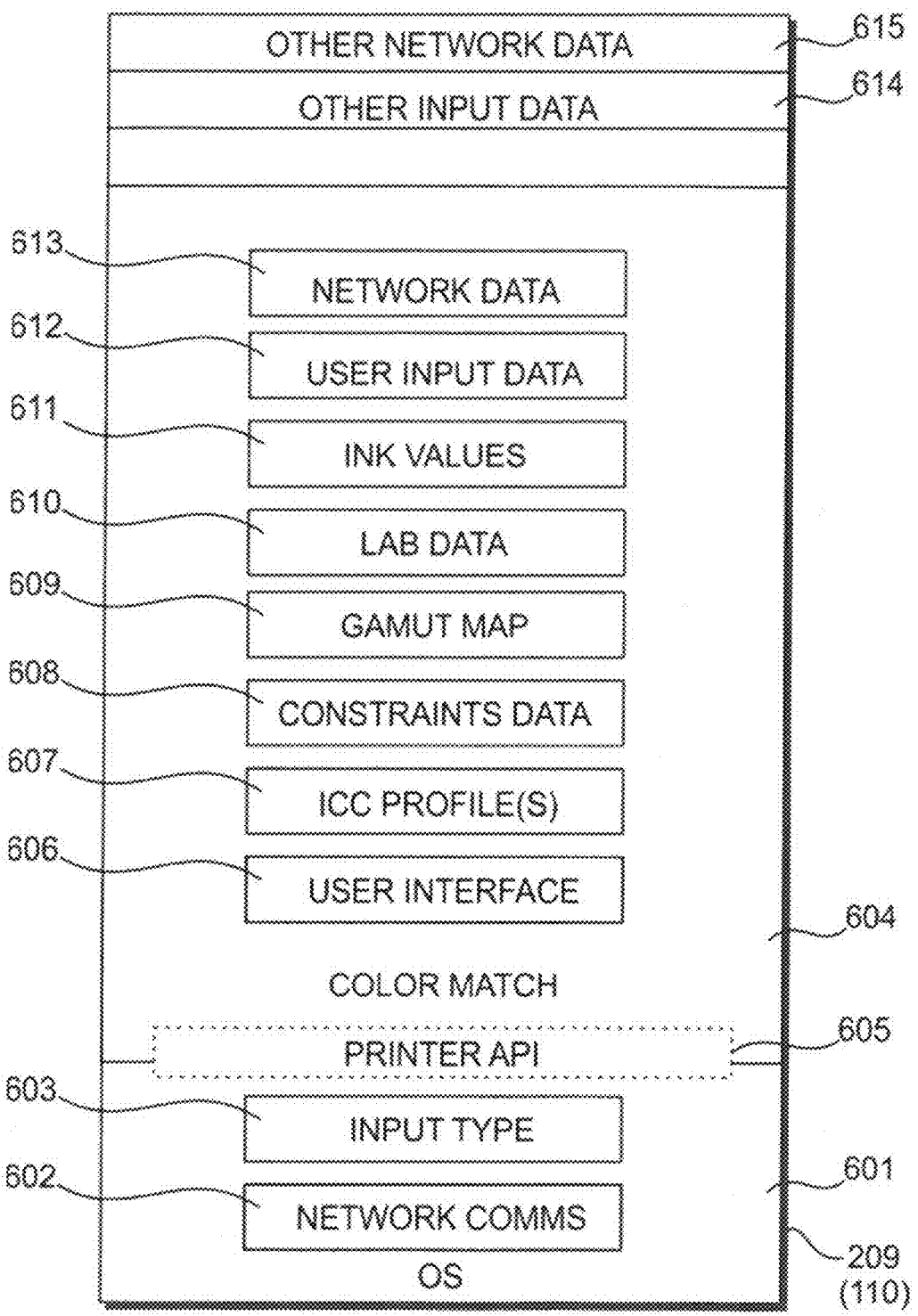
FIG. 6 is a logical diagram of the contents of the memory means of the terminal shown in FIGS. 1 and 2, including a set of instructions embodying a method such as shown in FIG. 5, and a user interface.
Figure 7:
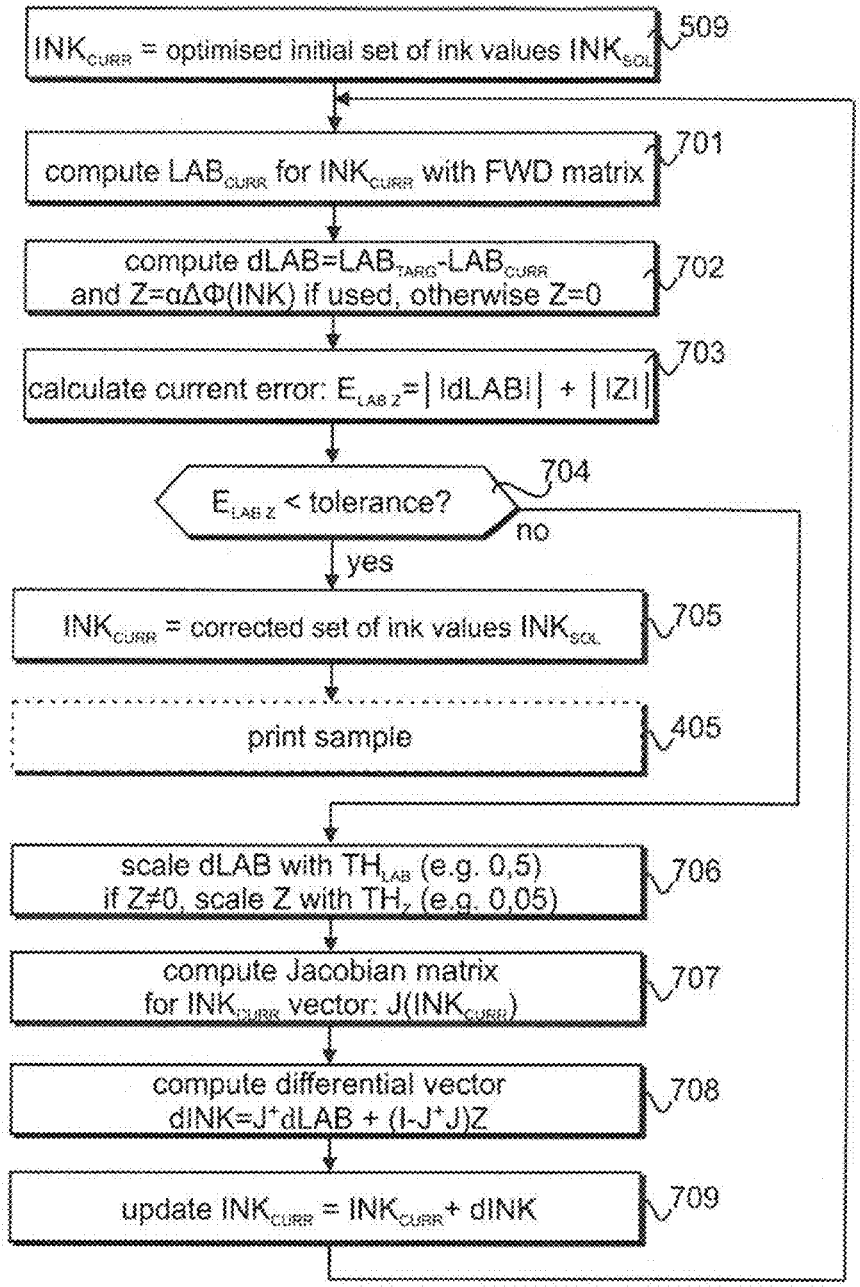
FIG. 7 illustrates steps of a second embodiment of a method according to the invention for matching colors and dosing ink in the system of FIG. 1.
Figure 8:
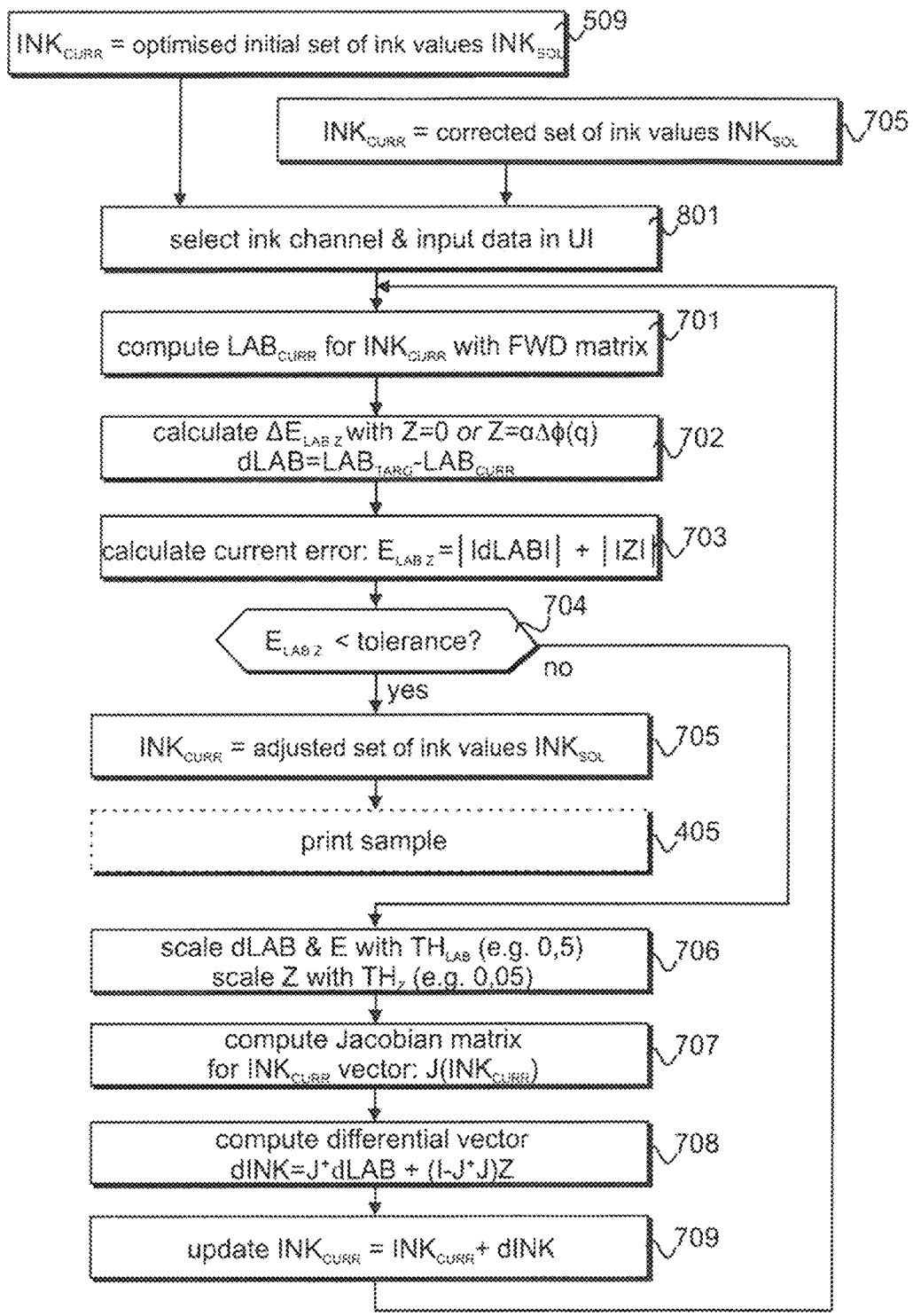
FIG. 8 illustrates steps of a third embodiment of a method according to the invention for matching colors and dosing ink in the system of FIG. 1.

In the printing system 100, methods according to the invention such as shown in FIGS. 5, 7 and 8 herein are embodied as a set of instructions processed by the computer 110 for dosing inks across the 6 inks channels of the printer 114. Accordingly, with reference to FIG. 6 now, the contents of the memory means 209 of the computer 110 at runtime include an operating system is shown at 601, for instance Windows 10™ distributed by Microsoft™ Inc. of Redmond, Wash., USA. The OS 601 includes instructions for governing the basic data processing, interdependence and interoperability of the computer hardware components as described with reference to FIG. 2, and communication subroutines 602 to configure the computer 110 for bilateral network communication via the NIC 211 interfaced with the wired connection 112 to the local router 118. The OS 601 also includes input subroutines for reading and processing input data variously consisting of user direct input to human interface devices, namely the keyboard 203 and computer mouse 204.

A set of instructions is next shown at 604, which is interfaced with the printer 114 and the spectrophotometer 116 through the OS 601 via one or more Application Programmer Interfaces (API) 605. The set of instructions 604 comprises and coordinates the data processing activity of further function-specific data processing subroutines embodying the various functions and algorithms described herein, including a user interface 306 updated and output to the display 202 in real-time.

The set of instructions 604 further maintains a variety of data sets processed by such data processing subroutines, including one or more ICC profiles of the printer 114 shown at 607; data representative of default and user-specified constraints shown at 608; a gamut map 609 for output to the user interface 605; CIELAB data variously acquired, processed and user-selected shown at 610; and one or more sets of ink values $INK_{sol}$ corresponding to respective dosages of ink channels and shown at 611.

Figure 9:
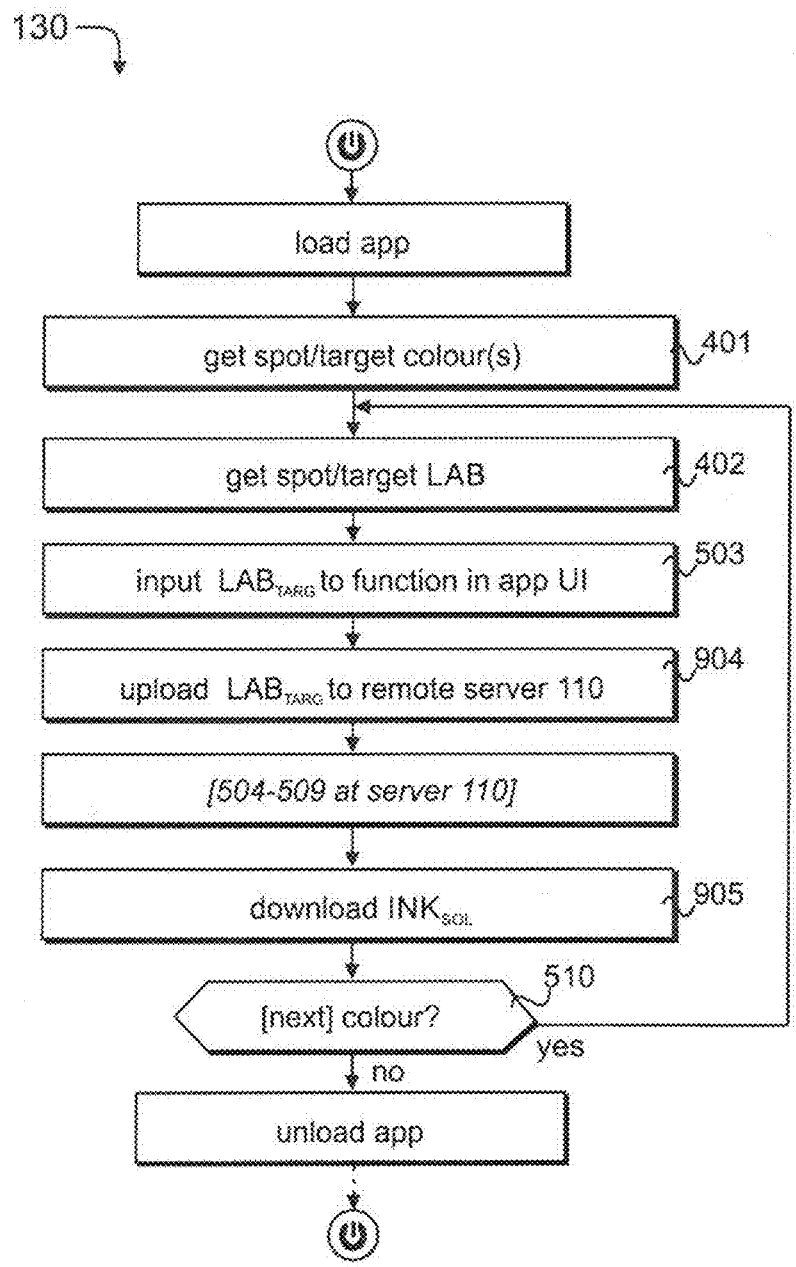
FIG. 9 illustrates steps of a fourth embodiment of a method according to the invention for matching colors and dosing ink in the system of FIG. 1.

Application data received from the user via the keyboard 203 and computer mouse 204 through the OS 601 into the user interface 605 by way of target CIELAB values (step 503) and ink optimization constraint(s) (step 505) is shown at 612. Network application data is further shown at 613, which comprises for instance spectrophotometer color data, printer status data and, in an embodiment described hereinafter with reference to FIG. 9, wherein application data for the color matching application 604 is received from a remote device 130, remote user input target CIELAB data.

Further local data 614 and network data 615 may be stored in the memory means 209 at runtime, some or all of which may be processed either by the color matching application 604 and subroutines thereof, or by or for other application(s) being processed in parallel with the color matching application 604. An example of further local data 613 is for instance printer spooling data in response to a printing instruction from an instantiation of step 405. An example of further network data 614 is for instance remote application or OS updating data communicated by a remote server over the WAN 120.

Even with the benefit of an initial set of ink values 611 optimised according to the invention, color correction at the ink level would likely remain necessary to some extent, when color matching a target CIELAB value. This is conventionally done by operators observing the CIEDE2000 error value on each CIELAB axis and modifying ink values on that basis. However, modifying ink values to correct the error on one of the LAB axis, also modifies the values on the other two LAB axes, meaning that, to correct the errors on each of the three LAB axis, all the ink channels have to be modified simultaneously. For a CMYKOrGr printer 114, this means correcting 6 ink values, which is a complicated task due to the nonlinear relation between the inks and the CIELAB values.

Advantageously, a second embodiment of the method of the invention comprises a correcting function to modify the ink channels automatically, based on a desired CIELAB value change on 1 axis, including in the initial set of optimized ink values 611, whilst preserving the other 2 values in the CIELAB color space. Skilled persons will appreciate from the foregoing, that this second embodiment of the method may be easily modified, in order to base the automatic modification of ink channels on a desired CIELAB value change on more than 1 axis.

The correcting function is based on forward and inverse models more normally associated with the field of robotics and the computation of vectors, particularly through models expressed in differential terms, for posing end-effectors in robotic systems for which a Jacobian matrix can be defined. For a straightforward comparison, the CIELAB colorimetric value is analogous to an end-effector pose X and the INK vector containing the N-Ink channels values is analogous to robot joint variables q. Continuing with this analogy, the function defining the end-effector pose X in function of the joint variables q is nonlinear, like the function f defining the printer forward model. As it is normally difficult, sometimes even impossible, to explicitly inverse certain nonlinear functions, it is very difficult to calculate an explicit function defining the inverse model both for robots and printers. A solution used in robotics is to approximate the nonlinear function by a linear function, then to solve the problem through iterations. This is done using the differential forward model which defines a linear function that can be inverted. Using both the forward and inverse differential model, the inverse problem can be solved through an iterative process.

So similarly to a robotic differential forward model in a planar space, a printer differential forward model can define the differential colorimetric change dLAB produced by a differential change in an inks vector dINK, which may be expressed as:

$$dLAB = J(INK) \cdot dINK$$

wherein J(INK) is a Jacobian matrix, elements of which are defined as:

$$J_{ij} = \frac{\partial f_i(INK)}{\partial INK_j}$$

Wherein $f_i$ is the i-th element of the vector function f defining the printer forward model which is nonlinear.

When the number of variables to solve and equations is equal, which is the case of printers with 3 ink channels (e.g. CMY printers), the Jacobian matrix J is square and therefore invertible. Therefore, the printer differential inverse model can be expressed explicitly as:

$$dINK = J(INK)^{-1} \cdot dLAB$$

When there are more variables than equations, which is the case for printers 114 with more than 3 ink channels, a best least squares solution can be obtained using the Generalized Least Squares method. One of the key elements to using this type of algorithms is being able to compute the inverse of the linearized function, which can be achieved through the "generalized inverse" matrix or the pseudoinverse $J^+$. This inverse matrix can be calculated even for matrices near singularities and/or non-squared, in which cases normal algorithms would fail to calculate an inverse matrix. Using the pseudoinverse matrix, the generalized solution of the differential inverse model of a printer with N ink channels can thus be stated as:

$$dINK = J^+ dLAB + (I - J^+ J)Z$$

$$dINK = J^+ dLAB + \alpha(I - J^+ J)\nabla\phi(INK)$$

wherein I is the identity matrix of size N×N; Z is a vector (N×1) in the dINK space representing an optimization term; $E\phi$ is the gradient of a function $\phi(INK)$ that is to be optimized. The second term expresses a dINK value in the Null space of J, i.e. differential ink changes dINK that do not produce any change in the colorimetric value dLAB. This term in the null space is used to optimize the function $\phi(INK)$.

Turning to FIG. 7 now, a second embodiment of a method of color matching to dose ink in the multichannel printer 114 according to the invention is described, in which the initial set of optimized ink values $INK_{sol}$ last output at step 509 is corrected according to the above technique.

Accordingly at a step 701 which follows step 509, the set of CIELAB colorimetric values $LAB_{curr}$ produced by the first vector $INK_{curr}$ are computed, in this embodiment with the printer's differential forward model.

At step 702, the CIELAB colorimetric error CIE76 in the CIELAB colorimetric space is computed as:

$$dLAB = LAB_{targ} - LAB_{curr}$$

An optimization term Z may be used with the data correcting function of the second embodiment. The optimization term Z is set to a null value when it is not used. Thus at step 703, the current error $E_{LAB\ Z}$ is computed as:

$$E_{LAB\ Z} = \|dLAB\| + \|Z\|$$

A question is then asked at step 704, about whether the current error $E_{LAB\ Z}$ is below a given tolerance value, for example 1. When the current error $E_{LAB\ Z}$ is below the given tolerance value, then at step 705 the first vector $INK_{curr}$ is declared a satisfactory solution, i.e. a corrected set of ink values $INK_{sol}$ 611 corresponding to updated respective dosage of each ink channel in the printer 114, which produces a CIELAB value $LAB_{targ}$ that is closer to the targeted CIELAB value, than that which was achieved with the initial set of optimized ink values of step 509. Optionally, a sample may then be printed (405) with the printer 114, with having its ink channels dosed according to the corrected set of ink values $INK_{sol}$ 611. In a variant of step 705, should any of the ink values in the set $INK_{sol}$ lie outside of the printer gamut, then such values may usefully be clipped to a range representative of the printer gamut, e.g. [0,1].

Alternatively, when the current error $E_{LAB\ Z}$ exceeds the given tolerance value, then at step 706 the colorimetric error term dLAB is scaled in order to remain in the differential domain, with a threshold value $TH_{LAB}$ of 0.5 for example. The condition applied is:

if $\|dLAB\| > Th_{LAB}$, then $$dLAB = \frac{dLAB}{\|dLAB\|} Th_{LAB}$$

If the optimization term Z was used at step 702, then the Z vector is also scaled using a threshold value of $Th_z = 0.05$. The Z vector is defined in function of the inks values, and a value of 0.05 has been determined as optimal for ink values between 0 and 1. The condition applied is:

if $\|Z\| > Th_Z$, then $$Z = \frac{Z}{\|Z\|} Th_Z$$

At step 707, the Jacobian matrix $J(INK_{curr})$ is computed for the current ink vector $INK_{curr}$. At step 708, the ink differential vector dINK is computed using the generalized differential model as previously described. As with preceding steps 702 and 705, if the optimization term Z is not used, it is set to a null value. At step 709, the values for the current ink vector $INK_{curr}$ are updated according to the computed ink differential vector dINK. The data processing logic then returns to step 701 so that the set of CIELAB colorimetric values $LAB_{curr}$ produced by the updated $INK_{curr}$ may be computed, then steps 702 and 703 performed thereon, whence the tolerance check of step 704 is again performed on the updated error, and so on and so forth.

This algorithm converges rapidly and, on the basis of tests performed by the inventor, when using solving without the optimization terms and a small CIELAB step of [1 0 0], a solution is usually found in 5 iterations. Adding optimization terms increases the number of iterations to between 10 and 150 depending on the Z term used. But even in those scenarios, the computation time is still close to 0.5 second.

A user benefits from the method of the second embodiment to find ink dosage values that correct the colorimetric CIELAB errors in the initially optimized ink values, but may still need to analyze samples visually for assessing other color factors, such as opacity or color saturation. Should these further factors require further adjustment in the inks dosage, then the user would benefit from a tool to find other ink values INK that produce the same optimized or corrected CIELAB colorimetric value LAB.

Accordingly, in a third embodiment, the method is further adapted to adjust optimized or corrected ink channel values, whilst maintaining a substantially same CIELAB value, i.e. for a given target or current CIELAB value, the user is able to modify a given ink channel value amongst the 6 ink channels of the printer 114, as initially optimized at step 509 or as subsequently corrected at step 705, and the other ink channel values are automatically adjusted. This is because the colorimetric error is only one of the factors in color perception: for example, a given ink value may have a low CIEDE2000 error, but exhibit poor opacity or color saturation, whence there is an advantage to having multiple concurrent sets of ink values that produce a CIELAB value equal or close to the target value.

With reference to FIG. 8, this technique can be implemented using substantially the same correcting function as in the second embodiment, but with an additional optimization term. The goal of this function is to obtain a target CIELAB value while changing a given ink channel value $INK_i$. The notion of changing a given ink channel is similar to that of setting a given ink channel to a desired value, therefore the formula used for the fourth term of the cost function E, the desired ink error function, can be adapted to this case, but just applied to a single channel. Thus the function $\varphi$ to be optimized can be written as:

$$\varphi = \tfrac{1}{2}(INK_i - INK_{des\ i})^2$$

wherein the subindex i corresponds to the i-th ink channel to be modified.

From there, the vector Z can be defined as:

$$Z = \alpha \nabla \varphi(INK) = \alpha [0 \ldots INK_i - INK_{des\ i} \ldots 0]^T$$

The operation $INK_i - INK_{des\ i}$ appears in the i-th element of vector Z. After making some tests, a good balance with the dLAB term is achieved by setting $\alpha = -0.5$.

Accordingly in the third embodiment, the adjusting function starts from a point where an ink dosage solution actually exists, that is an INK and LAB pair as provided either at step 509 or at step 705. At step 801, the user selects the ink channel to adjust and inputs adjusting data in the user interface 605. Steps 701 to 709 are then repeated substantially as described herein, wherein dLAB is computed at step 702 according to the modified adapted desired ink error function. Optionally, the color may be printed and controlled physically by following steps 405 to 408. If the printed sample is not deemed satisfactory, the user may restart the process from step 801 to find a different ink dosage which produces the target color.

In a fourth embodiment of the method according to the invention, the color matching and associated ink dosage principles described herein are distributed to one or more remote terminals, at which one or more of the target color data, the constraint data and the user interface interaction data is input to a local application and broadcast to the computer 110 across the networked environment of FIG. 1 for processing by the set of instructions 604.

With reference to FIG. 8, at its simplest the method involves installing and loading a set of instructions at the mobile device 130, obtaining the table 150 of spot or target colors for a printing job at hand proximate the mobile device 130 at step 401. CIELAB values of a first color in the table may be obtained at step 402, representative of the targeted printed color.

At step 503, the user of the mobile device 130 inputs CIELAB data corresponding to the obtained targeted printed color values $LAB_{targ}$, in a user interface of the local set of instructions. The input CIELAB values are then uploaded to the remote computer 110 of the printing system 100 at step 904, whence they are processed according to steps 504 to 509 as described hereinbefore; optionally further processed for correction according to steps 701 to 709 and/or for adjustment involving steps 801 and 802.

The solution ink dosage $INK_{sol}$ output at step 509 or 705 is eventually downloaded from the remoter computer 110 at step 905. Again, so long as one or more color(s) remain in the table 150 of spot or target colors, for which the CIELAB values need to be targeted and then an initial set of optimized ink values $INK_{sol}$ computed, a question asked at step 510 is answered positively for returning control to step 402, at which CIELAB values of the next color in the table are obtained, representative of the next-targeted printed color values $LAB_{targ}$. The algorithm cycles until all colors in the table 150 of spot or target colors at the location of the mobile device 130 remote from the printing system 100 have been processed. This embodiment may usefully allow a user to configure one or more digital printer(s) 114 local to the mobile device 130 and remote from the printing system 100, without network connectivity to the said printing system 100.

Figure 10:
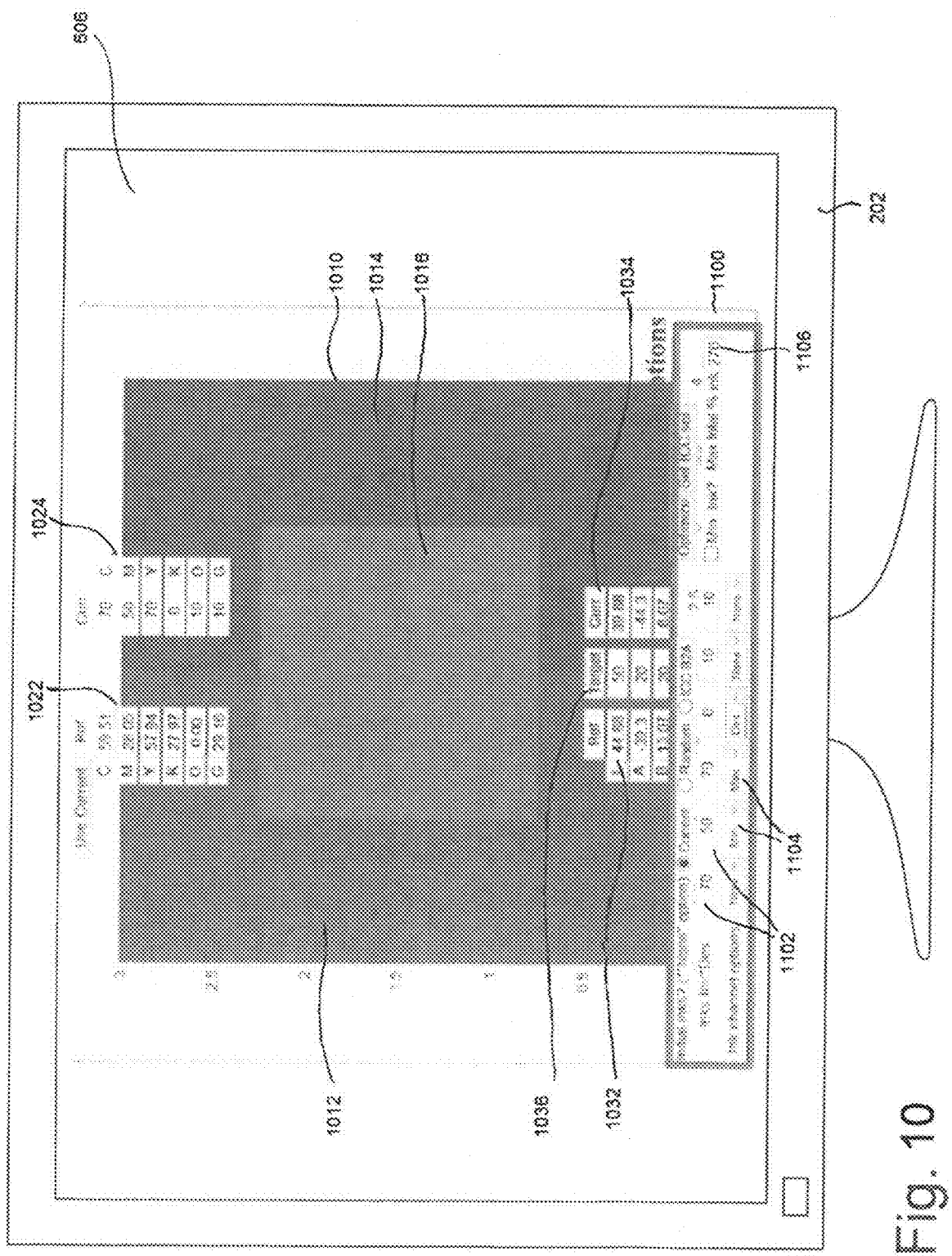
FIG. 10 illustrates the user interface of FIG. 6 configured for use with the first embodiment of FIG. 5.
Figure 11:
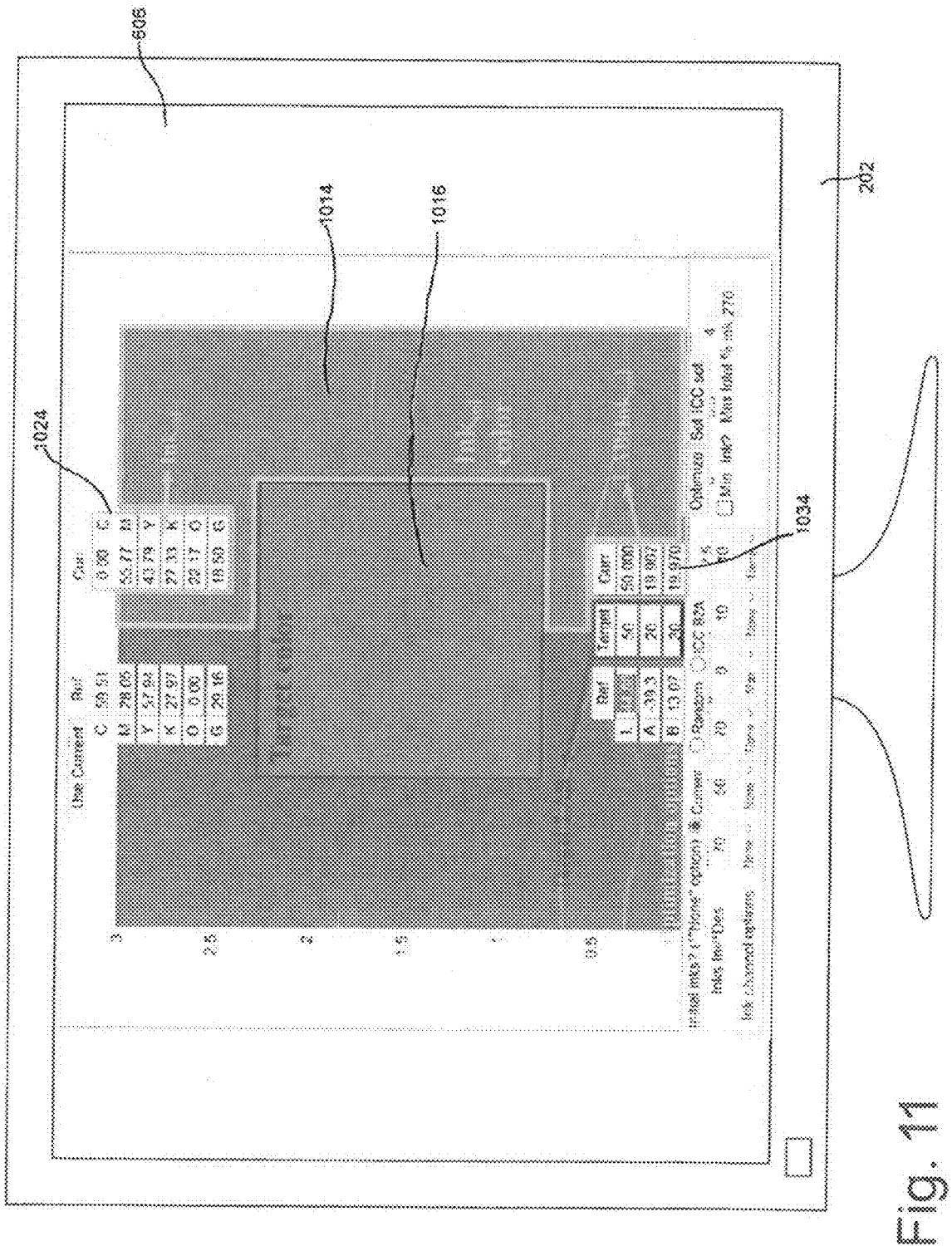
FIG. 11 illustrates the user interface of FIG. 10 after performing the steps of FIG. 5.
Figure 12:
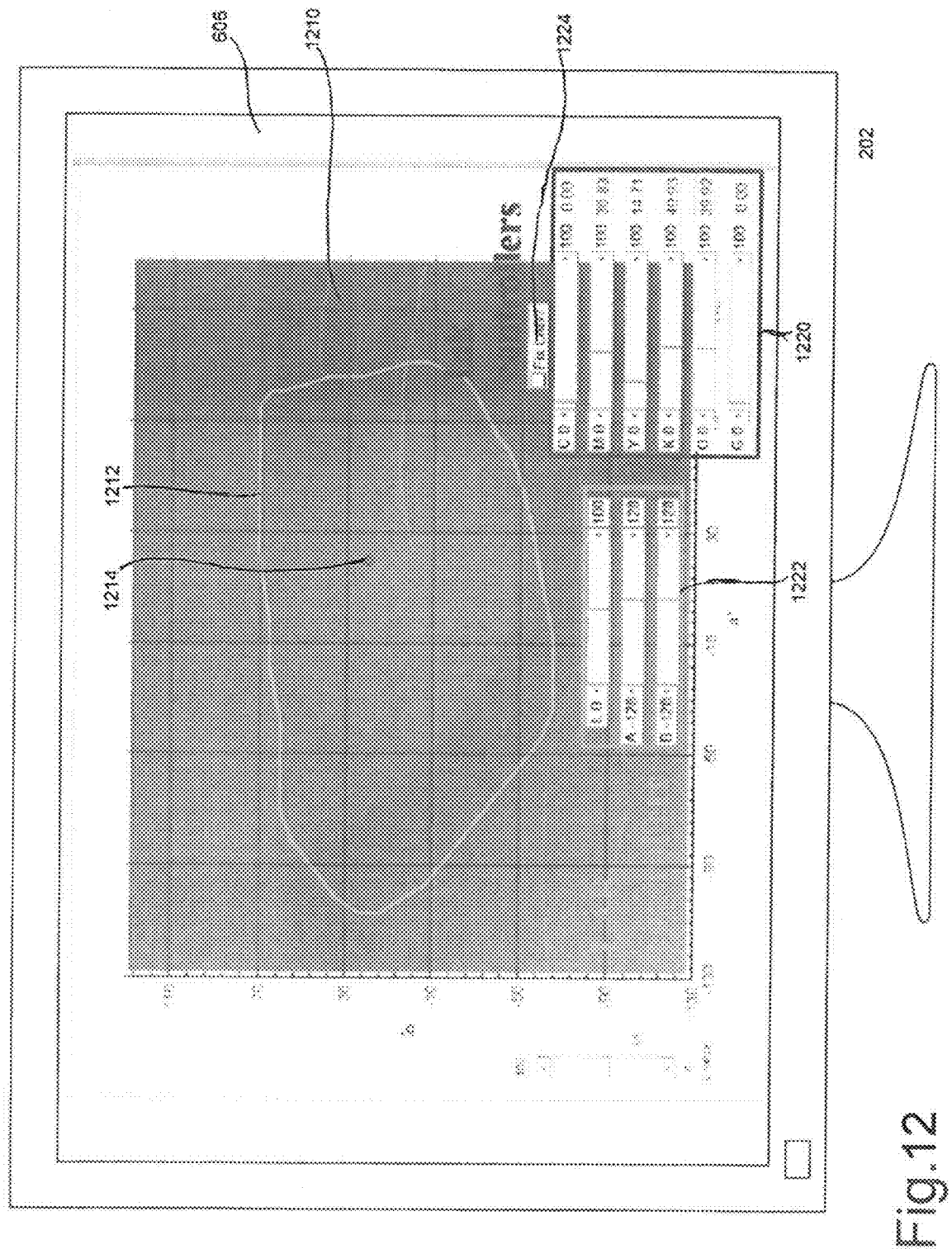
FIG. 12 illustrates the user interface of FIG. 6 configured for use with the second and optionally third embodiments of FIGS. 7 and 8.

An example embodiment of the user interface 606 output to the VDU 202 by the set of instructions 604 is shown in FIGS. 10 to 12. In a first configuration shown in FIGS. 10 and 11, a first main portion 1010 of the interface is divided to represent two areas 1012, 1014 of color side by side. A reference color 1012 with CIELAB values $LAB_{ref}$ is represented visually on the left and the current color 1014 with CIELAB values $LAB_{curr}$ corresponding to the current ink vector $INK_{curr}$ is represented on the right. Portions of the parallel areas 1012, 1014 are overlaid centrally and equidistantly with a square area 1016 of color corresponding to the targeted color with CIELAB values $LAB_{targ}$.

Respective values for each of the 6 ink channels $INK_{ref}$ of the printer 114 corresponding to the reference color $LAB_{ref}$ shown in the left area 1012 are indicated in a first window 1022 overlaying a small top portion of that left area 1012. Respective values for each of the 6 ink channels of the printer 114 corresponding to the current ink vector $INK_{curr}$ shown in the right area 1014 are indicated in a second window 1024 overlaying a small top portion of that right area 1014.

Respective values in the CIELAB color space of the reference color $LAB_{ref}$ shown in the left area 1012 are indicated in a third window 1032 overlaying a small bottom portion of that right area 1012. Respective values in the CIELAB color space $LAB_{curr}$ corresponding to the current ink vector $INK_{curr}$ shown in the right area 1012 are indicated in a fourth window 1034 overlaying a small bottom portion of that right area 1012. Respective values in the CIELAB color space of the targeted color $LAB_{TARG}$ shown in the central square area 1016 are indicated in a fifth window 1036 centrally of the third and fourth windows 1032, 1034.

A second main portion 1100 of the interface underneath the first is user interactable and referred to as "ink optimization controllers". That portion 1100 comprises respective user input interfaces for each of the 6 ink channels of the printer 114, including six numerical input windows 1102 for setting either the initial dosage of each ink channel or a desired ink dosage in the computed solution, three buttons grouped together and adapted to set the numerical input windows 1102 to the current ink dosage, a random ink dosage or the ink values that the ICC printer profile computes for the target CIELAB values and six drop-down menus 1104 to specify the minimization, maximization, etc. of each ink channel. The values of the numerical input windows 1102 are used as: an initial dosage on the ink channel for the algorithm when the option "None" is selected in the drop-down menu 1104 or as a desired ink dosage in the computed solution when the option "Des" is selected in the drop-down menu 1104, otherwise these values are not used by the algorithm. A right side of the second main portion 1100 further includes a numerical input window 1106 for inputting a total area coverage value.

In FIG. 10, the values in the five numerical data windows 1022 to 1036 are shown at initializing time. In FIG. 11, the values are shown after computing the initial set of optimized ink values $INK_{sol}$ 611 at step 509: the second window 1024 shows the respective values for each of the 6 ink channels of the printer 114 corresponding to the current ink vector $INK_{curr}$ that are now equal to the initial set of optimized ink values $INK_{sol}$ 611, and the fourth window 1034 shows the respective CIELAB values $LAB_{curr}$ of that same ink set 611. Further, in FIG. 11 the right area of color 1014 now shows the color 1014 as processed according to that same ink set 611, conveniently affording a fast visual comparison against the targeted color $LAB_{targ}$ shown in the central square area 1016.

In a second figuration of the user interface 606 shown in FIG. 12, most of the interface is taken by a planar and gridded representation 1210 of the CIELAB color space, wherein with the gamut map 609 is delimited across the CIELAB color space by a line 1212, and the position of the set of CIELAB values $LAB_{curr}$ corresponding to the current ink vector $INK_{curr}$ 611 within the CIELAB color space is represented by a dot 1214.

Two distinct sets of user interactable controllers are overlaid fully or partially on the CIELAB grid 1210. A first set 1220 of sliders, referred to as "ink controllers", provides real-time user control over the current ink values $INK_{curr}$ and, using the printer forward model, they update the current CIELAB value $LAB_{curr}$. A second set 1222 of sliders, referred to as "LAB controllers", provides real-time user control over each component of the current CIELAB value $LAB_{curr}$ and, using the correcting function of the second embodiment, they obtain an ink vector that produces $LAB_{curr}$ and set it as new the current ink vector $INK_{curr}$. The "LAB controllers" can displace the current $LAB_{curr}$ point 1214 from its current position by any number of units in the L, A or B direction only, to a further position. The ink values INK which produce the corresponding LAB values are calculated as described herein.

The two configurations of the interface 606 shown in FIGS. 10 to 12 is equally suited to implement user interaction with the adjusting function of the third embodiment, wherein the desired ink value $INK_{des\,i}$ on a given ink channel can be set using the "ink controllers" 1220 but ticking a "Fix LAB?" check button 1224. Then, using the adjusting function, the other ink channels of the current ink vector $INK_{curr}$ are adjusted so that the current CIELAB value $LAB_{curr}$ remains unchanged. When using the adjusting function, the "LAB controllers" 1222 may usefully be disable, to avoid any confusion for the user.

The present invention thus provides a computer-implemented method for initially dosing ink in a digital printer with at least 6 ink channels automatically, embodiments of which further provide for easily correcting and adjusting values representative of the initial ink dosage.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A computer-implemented method for determining a set of ink values ($INK_{sol}$) corresponding to respective dosage of each ink channel of a digital printer (114) with at least 6 ink channels, wherein the determined set of ink values produces a target printed color, the method comprising the steps of
obtaining (402) colorimetric values in a device-independent color space (CIELAB), representative of target colorimetric values ($LAB_{targ}$) of the target printed color;
inputting (503) the obtained colorimetric values ($LAB_{targ}$) to the computer;
initialising (504) a set of ink values ($INK_{ini}$) according to a user selection;
inputting (505) constraint data for a main cost function comprising four terms:
a) a color difference error function, computing a difference between current colorimetric values ($LAB_{curr}$) obtained with a current set of ink values ($INK_{curr}$) and the target colorimetric values ($LAB_{targ}$);
b) a physical gamut function, constraining each ink channel value to limits of the printer;
c) a total area coverage function, constraining a total amount of usable ink; and
d) a desired ink error function maximizing or minimizing one or multiple ink channels or setting same to a desired value;
computing (506) the current set of ink values ($INK_{curr}$) by minimizing the main cost function for the initialised set of inks ($INK_{INI}$);
computing (507) an error between the target colorimetric values ($LAB_{targ}$) and the current colorimetric values ($LAB_{curr}$) and comparing (507) the computed error against a tolerance value;
reinitialising the set of ink values ($INK_{ini}$) when the computed error exceeds the tolerance value or setting the current set of ink values ($INK_{curr}$) as the determined set of ink values ($INK_{sol}$); and
printing a sample according to the determined set of ink values ($INK_{sol}$).

2. The computer-implemented method according to claim 1, wherein the step of initialising the set of ink values ($INK_{ini}$) further comprises selecting from ink values input to the computer by a user, random ink values, ink values obtained from computing the input colorimetric values with an ICC profile of the printer.

3. The computer-implemented method according to claim 1, comprising the further step of clipping the determined set of ink values ($INK_{sol}$) to a range representative of the digital printer gamut, if any of the ink values in the set lie outside of the printer gamut.

4. The computer-implemented method according to claim 1, wherein the color space is the International Commission on Illumination ('CIE') Lightness, green-red and blue-yellow ('LAB') color space, whereby each colorimetric value is a set of lightness, green-red color and blue-yellow color component values.

5. The computer-implemented method according to claim 1, wherein the desired ink error function computes a difference between a first vector representative of current set of ink values ($INK_{curr}$) and a second vector representative of desired ink values ($INK_{des}$) and wherein the function is weighed by a vector of flags ($flag_{INK}$) used for adjusting the value of the second vector ($INK_{des}$), a vector representative of the initialised set of ink values ($INK_{ini}$) and a vector of weights ($S_{INK}$) applicable to each ink channel.

6. The computer-implemented method according to claim 5, comprising the further steps of computing (701) the current colorimetric values ($LAB_{curr}$) produced by the first vector ($INK_{curr}$);

computing (702) a differential colorimetric change (dLAB) representative of a colorimetric error between the target colorimetric values ($LAB_{targ}$) and the current colorimetric values ($LAB_{curr}$);

computing (703) an error value ($E_{LAB\ Z}$) based on the computed differential colorimetric change (dLAB) and optionally an optimization term (Z);

comparing (704) the computed error value against a predetermined tolerance value; and setting (705) the first vector ($INK_{curr}$) as a corrected set of ink values (611) when the computed error value ($E_{LAB\ Z}$) does not exceed the predetermined tolerance value.

7. The computer-implemented method according to claim 6 wherein, when the computed error value ($E_{LAB\ Z}$) exceeds the predetermined tolerance value, the method comprises the further steps of scaling (706) the differential colorimetric change (dLAB) if it exceeds a predefined threshold value ($Th_{LAB}$);

optionally scaling the optimization term (Z) if it used to compute (703) the error value ($E_{LAB\ Z}$) and if it exceeds another predefined threshold value (Thz);

computing (707) a Jacobian matrix for the first ink vector ($INK_{curr}$) and a pseudoinverse of the Jacobian matrix;

computing a differential ink vector (dINK) with the pseudoinverse based on the scaled differential colorimetric change value (dLAB) and optionally on the scaled optimization term (Z); and updating the computed ink values ($INK_{curr}$) according to the computed differential ink vector (dINK).

8. The computer-implemented method according to claim 7, wherein the optimization term (Z) is representative of a modification to the desired ink error function for application to a single channel of the printer, the method comprising the further steps of selecting the ink channel to adjust and inputting adjusting data in a user interface before performing the steps of claim 4 with the optimization term (Z).

9. The computer-implemented method according to claim 6, comprising the further step of assessing the colorimetric error value numerically, and visually by considering one or more factors selected from opacity, color saturation and graininess.

10. A digital printing system comprising a digital printer with at least 6 ink channels, a data processing terminal internal to or operably interfaced with the digital printer, a set of instructions stored at the printer or the terminal and which, when read and processed by the terminal, configures that terminal to perform the steps of the method according to claim 1, and means for inputting at least the target colorimetric value.

11. A user interface for output on display means of the digital printing system according to claim 10, comprising user-interactable means for inputting (503) the obtained colorimetric values ($LAB_{targ}$) and (505) constraint data for the main error function.

* * * * *